United States Patent [19]

Chang et al.

[11] Patent Number: 4,678,835

[45] Date of Patent: Jul. 7, 1987

[54] COATING COMPOSITION CONTAINING AN UNGELLED REACTION PRODUCT AS A CURATIVE

[75] Inventors: Wen-Hsuan Chang, Gibsonia; Edward L. Dufford, Sarver; J. Alden Erikson, Gibsonia; Paul J. Prucnal, Pittsburgh, all of Pa.

[73] Assignee: PPG Industries, Inc., Pittsburgh, Pa.

[21] Appl. No.: 824,040

[22] Filed: Jan. 30, 1986

[51] Int. Cl.$^4$ ................................................ C08F 8/00
[52] U.S. Cl. ...................................... 525/100; 525/403; 525/446; 525/453; 525/431; 528/17; 528/18; 528/21; 528/22; 528/23; 528/27; 528/28; 528/32
[58] Field of Search .............. 525/403, 100, 453, 446, 525/431; 528/18, 17, 23, 21, 22, 27, 28, 32

[56] References Cited

U.S. PATENT DOCUMENTS

| | | | |
|---|---|---|---|
| 4,250,074 | 2/1981 | Foscante et al. | 260/32 |
| 4,399,261 | 8/1983 | Kato et al. | 525/342 |
| 4,467,081 | 8/1984 | Chang et al. | 528/28 |
| 4,474,930 | 10/1984 | Mikami et al. | 525/507 |
| 4,518,726 | 5/1985 | Kato et al. | 524/32 |
| 4,562,237 | 12/1985 | Okuno et al. | 528/17 |
| 4,604,443 | 8/1986 | Chang et al. | 528/28 |

FOREIGN PATENT DOCUMENTS

| | | |
|---|---|---|
| 0063817 | 2/1982 | European Pat. Off. . |
| 133796 | 2/1984 | Japan . |

*Primary Examiner*—Melvyn I. Marquis
*Attorney, Agent, or Firm*—Linda Pingitore

[57] ABSTRACT

A coating composition contains at least 15 percent by weight of an ungelled reaction product of:
(i) at least 2 percent by weight of an amine having in a molecule thereof at least one amino hydrogen atom, and at least one silicon atom directly bonded to a hydrolyzable group;
(ii) at least 4 percent by weight of a material containing at least one epoxide group, at least 30 percent of said material being essentially free of hydroxyl groups; and
(iii) a material selected from vinyl alkoxysilanes; non-functional organosilanes; organosilicates; and partial hydrolysis products thereof; the percentages by weight being based on the total weight of the resin solids of the coating composition including (i), (ii) and (iii).

30 Claims, No Drawings

COATING COMPOSITION CONTAINING AN UNGELLED REACTION PRODUCT AS A CURATIVE

BACKGROUND OF THE INVENTION

The present invention is directed to coating compositions which do not depend on isocyanates as curatives.

There is a growing need for coating compositions which do not depend on organic polyisocyanates for curing and which exhibit desirable coating properties such as long potlife, hardness, solvent resistance, and the ability to cure at low temperatures.

SUMMARY OF THE INVENTION

In accordance with the present invention there is provided a coating composition comprising at least 40 percent by weight of an ungelled reaction product of:
(i) at least 2 percent by weight of an amine having in a molecule thereof at least one amino hydrogen atom and at least one silicon atom directly bonded to a hydrolyzable group;
(ii) at least 4 percent by weight of a material containing at least one epoxide group, at least 30 percent of said material being essentially free of hydroxyl groups; and
(iii) a material selected from vinylalkoxysilanes; nonfunctional organosilanes; which are represented by the following structural formula:

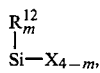

wherein
$R^{12}$ is hydrogen, alkyl, aryl, alkylaryl, arylalkyl, or aryloxyalkyl;
X is $-OR^1$,

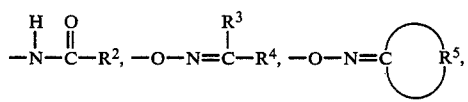

and the monohydroxyl cyclic $C_2$-$C_3$ residue of a 1,2- or 1,3-glycol,
wherein
$R^1$ is $C_1$-$C_3$ alkyl,
$R^2$ independently is H or $C_1$-$C_4$ alkyl,
$R^3$ and $R^4$ independently are H, $C_1$-$C_4$ alkyl, $C_6$-$C_8$ aryl, and
$R^5$ is $C_4$-$C_7$ alkylene, and
m is an integer ranging from 1 to 2;
organosilicates which are represented by the following structural formula:

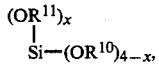

wherein
$R^{10}$ is $C_1$ to $C_3$ alkyl;
$R^{11}$ is an alkyl radical having at least 4 carbon atoms, aryl, alkylaryl, arylalkyl, aryloxyalkyl, or alkyloxyalkyl and
x is an integer from 0 to 2;
and partial hydrolysis products thereof; the percentages by weight being based on the total weight of the resin solids of the coating composition including (i), (ii) and (iii).

The present invention is also directed to a coating composition comprising at least 15 percent by weight of (a), an ungelled reaction product as set forth above, as a curative for another material, (b), different from the ungelled reaction product and containing functionality capable of cocuring with the ungelled reaction product.

The present invention is also directed to a two-pack coating composition comprising:
(a) a first pack comprising an ungelled reaction product as detailed above; and
(b) a second pack comprising another material different from (a) containing functionality capable of cocuring with (a); the ungelled reaction product being present in the coating composition in an amount of at least 15 percent by weight; the percentages by weight being based on the total of weight of the resin solids of the coating composition including (i), (ii) and (iii).

The present invention is also directed to a coating composition comprising an ungelled reaction product of:
(i) an amine having in a molecule thereof at least one amino hydrogen atom and at least one silicon atom directly bonded to a hydrolyzable group;
(ii) a material containing at least one epoxide group;
(iii) a material selected from vinylalkoxysilanes; nonfunctional organosilanes; which are represented by the following structural formula:

wherein
$R^{12}$ is hydrogen, alkyl, aryl, alkylaryl, arylalkyl, or aryloxyalkyl;
X is $-OR^1$,

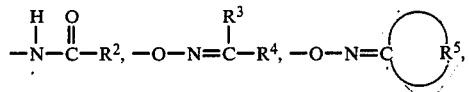

and the monohydroxyl cyclic $C_2$-$C_3$ residue of a 1,2- or 1,3-glycol,
wherein
$R^1$ is $C_1$-$C_3$ alkyl,
$R^2$ independently is H or $C_1$-$C_4$ alkyl,
$R^3$ and $R^4$ independently are H, $C_1$-$C_4$ alkyl, $C_6$-$C_8$ aryl, and
$R^5$ is $C_4$-$C_7$ alkylene, and
m is an integer ranging from 1 to 2;
organosilicates; which are represented by the following structural formula:

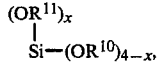

wherein
$R^{10}$ is a $C_1$ to $C_3$ alkyl,
$R^{11}$ is an alkyl radical having at least 4 carbon atoms, aryl, alkylaryl, arylalkyl, aryloxyalkyl, or alkyloxyalkyl and
x is an integer from 0 to 2;

and partial hydrolysis products thereof; and
(iv) an ungelled resin composition comprising an organic polymer having in a molecule thereof at least one group containing a silicon atom said group selected from:

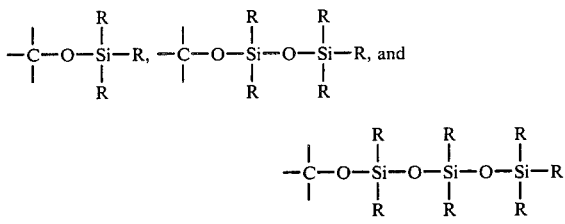

each R independently is selected from the group of moieties consisting of Y, hydrogen, a $C_1$-$C_{10}$ group joined to Si through an Si-C linkage, and $OR^{13}$ in which $R^{13}$ represents alkyl having at least 4 carbon atoms, aryl, alkylaryl, arylalkyl, aryloxyalkyl, or alkyloxyalkyl, wherein Y represents an easily hydrolyzable group which is independently selected from the group consisting of $OR^1$;

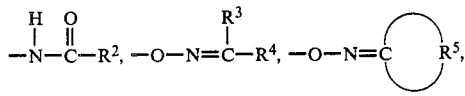

and the monohydroxyl cyclic $C_2$-$C_3$ residue of a 1,2- or 1,3-glycol, wherein
$R^1$ is $C_1$-$C_3$ alkyl,
$R^2$ independently is H or $C_1$-$C_4$ alkyl,
$R^3$ and $R^4$ independently are H, $C_1$-$C_4$ alkyl, $C_6$-$C_8$ aryl, and
$R^5$ is $C_4$-$C_7$ alkylene;
provided that said resin composition contains an amount of easily hydrolyzable Y moieties such that the ratio of the number of grams of said ungelled resin composition to equivalents of easily hydrolyzable Y moieties in said ungelled resin composition is in a range of from 40 to 667.

DETAILED DESCRIPTION OF THE INVENTION

A coating composition of the present invention comprises at least 15 percent by weight of an ungelled reaction product. As used herein, the term ungelled means that the reaction product is itself liquid at 25° C. or is capable of being liquified in the presence of a suitable solvent at 25° C. It should be understood that by reaction product is meant that the three starting components when blended together and permitted to stand at ambient temperature for a reasonable length of time (i.e., a period of time ranging from a few hours up to 2 days) the three components will appreciably interact to form an ungelled product. The degree of reaction achieved by the reaction product is substantially beyond that which is achieved at the time immediately after blending the components together at ambient temperature. Preferably, the reaction product is formed by combining the components together at elevated temperature for a period of time ranging from about 1 to about 16 hours. Typically the temperature ranges from about 40° C. to about 160° C., preferably 50° C. to 120° C., more preferably 60° C. to 90° C. The temperature will be largely dependent on the reactivity of the material utilized as well as the boiling point of the alcohol evolved from the silane component, (iii).

Preferably the claimed coating composition contains at least 40 percent by weight, more preferably at least 50 percent by weight of the ungelled reaction product, the percentages by weight being based on the total weight of (i), (ii), (iii) and all other resin solids present in the coating composition.

As has been mentioned above, the ungelled reaction product is prepared from three components. The first component, (i), is an amine having in a molecule thereof at least one amino hydrogen atom and at least one silicon atom directly bonded to a hydrolyzable group.

Examples of groups which can represent the hydrolyzable group bonded directly to Si include $-OR^1$,

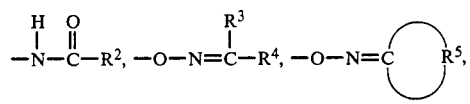

and the monohydroxyl and/or cyclic $C_2$-$C_3$ residue of a 1,2- or 1,3-glycol, wherein
$R^1$ represents $C_1$-$C_3$ alkyl, preferably $C_1$-$C_2$ alkyl, and more preferably methyl,
$R^2$ independently represents H or $C_1$-$C_4$ alkyl,
$R^3$ and $R^4$ independently represent H, $C_1$-$C_4$ alkyl, $C_6$-$C_8$ aryl, and
$R^5$ represents $C_4$-$C_7$ alkylene. Methoxy and ethoxy are particularly preferred hydrolyzable groups.

In a preferred embodiment the amine which contains at least one silicon atom directly bonded to a hydrolyzable group is represented by the following structural formula:

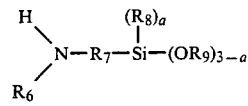

wherein:
$R_6$ is a $C_1$ to $C_{10}$ alkyl radical, hydrogen, an aminoalkyl radical, or an alkoxysilylalkyl radical;
$R_7$ is a $C_1$ to $C_{10}$ alkylene radical,
$R_8$ is a $C_1$ to $C_{10}$ alkyl radical,
$R_9$ is a $C_1$ to $C_3$ alkyl radical, and
a is an integer of 0 or 1.

Illustrative examples of suitable amine compounds having in a molecule thereof at least one amino hydrogen atom and at least one silicon atom directly bonded to a hydrolyzable group include gamma-aminopropyltrimethoxysilane, gamma-aminopropyltriethoxysilane, N-beta(aminoethyl)gamma-aminopropyltrimethoxysilane, beta-aminoethyltriethoxysilane, gamma-aminopropylmethyldiethoxysilane, gamma-aminopropylethyldiethoxysilane, gamma-aminopropylphenyldiethoxysilane, delta-aminobutyltriethoxysilane, delta-aminobutylethyldiethoxysilane, bis[3-(trimethoxysilyl)propyl]amine and $(CH_3O)_3-Si-(CH_2)_3-NH-(CH_2)_2-NH-(CH_2)_3-Si(OCH_3)_3$. Preferably the amine is either gamma-aminopropyltriethoxysilane or gamma-aminopropyltrimethoxysilane.

The amine component is typically utilized in an amount ranging from 2 to about 60 percent by weight, preferably from about 10 to about 50 percent by weight.

The second component, (ii), required in making the ungelled reaction product is at least 4 percent by weight of a material containing at least one epoxide group, with the proviso that at least 30 percent of said epoxide group containing material is essentially free of hydroxyl groups. The presence of the hydroxy free material contributes to the pot life of the ungelled reaction product. When the epoxide group containing material is entirely a hydroxyl group containing material, the ungelled reaction product exhibits a tendency to gel at ambient temperature after a period of several days to several weeks. Moreover, compatability problems during preparation can result in a non-homogeneous reaction mixture.

Examples of preferred epoxide group containing materials which are essentially free of hydroxyl groups include the diglycidyl ether of bisphenol A which can be purchased from Shell Chemical Company under the trademark designation EPON 828 and the diglycidyl ether of hydrogenated bisphenol A which can also be purchased from Shell Chemical Company under the trademark designation DRH 151. Other epoxide group containing materials free of hydroxyl groups include butylene oxide; beta-(3,4-epoxycyclohexyl)ethyltrimethoxysilane; the polyglycidyl ethers of mononuclear polyhydric phenols such as the polyglycidyl ethers of resorcinol, pyrogallol, hydroquinone and pyrocatechol; as well as the polyglycidyl ethers of polyhydric alcohols such as the reaction products of epichlorohydrin or dichlorohydrin with aliphatic and cycloaliphatic alcohols such as ethylene glycol, diethylene glycol, triethylene glycol, dipropylene glycol, tripropylene glycol, propane diols, butane diols, pentane diols, glycerol, 1,2,6-hexanetriol, pentaerythritol and 2,2-bis(4-hydroxycyclohexyl)propane, bisphenol A and bisphenol F.

The balance of the epoxide group containing material can contain hydroxyl groups. For example, the polyglycidyl ethers detailed above can be prepared so that they contain hydroxyl groups. This can be readily accomplished by reacting the phenol or alcohol with less epoxide material than is necessary to completely react with all of the hydroxyl groups. Examples of other hydroxyl functional epoxide group containing materials include the diglycidyl ether of bisphenol A commercially available from Shell Chemical Company under the trademark designation EPON 1001, glycerol polyglycidyl ether, trimethylolpropane polyglycidyl ether, diglycerol polyglycidyl ether, and polyglycerol polyglycidyl ether.

Also suitable are vinyl addition polymers containing epoxide groups. These vinyl addition polymers can be prepared by the free radical initiated vinyl addition polymerization of a vinyl monomer component of which a portion is made up of epoxy containing vinyl monomers such as glycidyl acrylate, glycidyl methacrylate, glycidyl itaconate, or allyl glycidyl ether. Examples of other vinyl monomers include acrylic and methacrylic acid and their ester derivatives such as (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate and isobornyl (meth)acrylate; amides and alkoxyalkylamides of acrylic and methacrylic acids such as acrylamide, methacrylamide, and N-butoxymethylacrylamide. Also useful in preparing the epoxide group containing vinyl polymer are vinyl monomers such as vinyl acetate, isopropenyl acetate, vinyl chloride and dimethyl maleate; vinyl aromatic monomers such as styrene, alpha-methylstyrene and vinyl toluene. It will be appreciated by those skilled in the art that these epoxy group containing polymers can be prepared in a variety of art-recognized ways. Therefore, no additional discussion will be included here. Additional examples of epoxide group containing materials can be found in the *Handbook of Epoxy Resins*, Henry Lee and Kris Neville, 1967, McGraw Hill Book Company.

The epoxy containing material is typically utilized in an amount ranging from 4 to about 80 percent by weight, preferably from about 20 to about 60 percent by weight.

The third component, (iii), of the ungelled reaction product is a material selected from vinylalkoxysilanes; nonfunctional organosilanes; organosilicates; and partial hydrolysis products thereof.

Suitable organosilicates can be represented by the following formula

wherein $R^{10}$ represents $C_1$ to $C_3$ alkyl;

$R^{11}$ represents an alkyl radical having at least 4 carbon atoms, aryl, alkylaryl, arylalkyl, aryloxyalkyl, or alkyloxyalkyl and x is an integer from 0 to 2, preferably 0 or 1, and most preferably 0.

Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane and the like. Mixtures of organosilicates also may be employed.

An example of an organosilicate, other than the above organosilicates, which may be utilized in the invention include

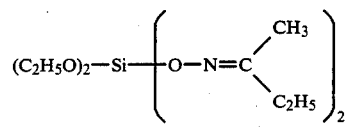

The partial hydrolysis products of the organosilicates also can be used. Hydrolyzed organosilicates provide an increased number of reactive groups per molecule.

In preparing a partial hydrolysis product, for example, from an organosilicate of the formula I above, a controlled amount of water typically is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where desired from organosilicates, can be found in formula (IV) infra. The partial hydrolysis product typically will contain greater than 5.0, and usually greater than 8.0, milliequivalents of residual easily hydrolyzable groups per gram of the partial hydrolysis product.

Where desired, organosilicates and/or partial hydrolysis products thereof containing higher alkoxy, aryloxy, arylalkyloxy, alkylaryloxy, alkyloxyalkyloxy, and- /or aryloxyalkyloxy moieties attached to one or more silicon atoms in addition to the easily hydrolyzable moieties may be employed for preparation of the compositions of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like.

As used herein, a nonfunctional organosilane is understood to mean a material corresponding to the formula (II),

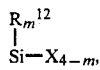     (II)

wherein
$R^{12}$ represents hydrogen, alkyl, aryl, alkylaryl, arylalkyl, or aryloxyalkyl;
X represents $-OR^1$,

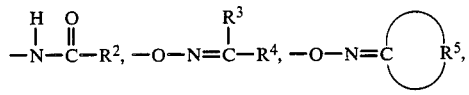

and the monohydroxy and/or cyclic $C_2$-$C_3$ residue of a 1,2- or 1,3-glycol,
wherein
$R^1$ represents $C_1$-$C_3$ alkyl, preferably $C_1$-$C_2$ alkyl, and most preferably methyl,
$R^2$ independently represents H or $C_1$-$C_4$ alkyl,
$R^3$ and $R^4$ independently represent H, $C_1$-$C_4$ alkyl, $C_6$-$C_8$ aryl, and
$R^5$ represents $C_4$-$C_7$ alkylene, and
m is an integer ranging from 1 to 2, preferably 1.

It should be understood that the term "nonfunctional organosilane" wherever appearing herein is used for convenience to distinguish compounds corresponding to the above formula (II) (and/or partial hydrolysis products thereof) from those compounds (and or partial hydrolysis products thereof) referred to herein as functional organosilanes and corresponding to formula (M) infra. Thus, although moieties defined by X in formula (II) are easily displaceable by reaction with water and/or alcohol and are, therefore, necessarily rather reactive, they are not defined herein as "functional".

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water typically is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (IV) infra. The partial hydrolysis product typically will contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized in the preparation of the ungelled reaction product a nonfunctional organosilane corresponding to formula (II) in which X corresponds to $-OR^1$ as defined above is employed.

Examples of nonfunctional organosilanes corresponding to the above formula, (II), include methyltrimethoxysilane (e.g., available from Union Carbide Corp. as A-163), dimethyldimethoxysilane, methyltriethoxysilane, dimethyldiethoxysilane, dimethoxydiphenylsilane, dimethoxymethylphenylsilane, diethoxydipropylsilane, dimethoxydipropylsilane, and the like. Additional examples of the nonfunctional organosilanes include amyltriethoxysilane and triethoxysilane. Compounds such as trimethylmethoxysilane, trimethylethoxysilane, and ethoxytripropylsilane may be employed where desired in limited, controlled amounts for modification purposes.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used in the preparation of the ungelled reaction product. Materials containing such moieties may be prepared, for example, by reacting a nonfunctional organosilane such as methyltrimethoxysilane (and/or a partial hydrolysis product thereof) with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxydimethoxymethylsilane, isopentoxydimethoxymethylsilane, 2-ethylhexoxydimethoxymethylsilane, 2-butoxyethoxydimethoxymethylsilane, diisodecyloxymethoxymethylsilane, phenoxydimethoxyphenylsilane, tolyloxydimethoxymethylsilane, phenylethyloxydimethoxymethylsilane, and the like. However, when a composition of the invention is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the composition should contain a residual amount of the more easily hydrolyzable moieties from the nonfunctional organosilane.

Also suitable as component (iii) in the preparation of the ungelled reaction product are vinylalkoxysilanes (and partial hydrolysis products thereof) such as vinyltrimethoxysilane and vinyltriethoxysilane.

It is to be understood that mixtures and/or partially hydrolyzed mixtures of the organosilicates (and/or partial hydrolysis products thereof), and/or the nonfunctional organosilanes (and/or partial hydrolysis products thereof), and/or the vinylalkoxysilanes (and/or partial hydrolysis products thereof) may be employed in the preparation of the ungelled reaction product.

Preferably the material of component (iii) is an alkylalkoxysilane or partial hydrolysis product thereof such as methyltrimethoxysilane or its partial hydrolysis products. The lower alkyl alkoxysilanes such as this preferred material are more desirable since they tend to increase the ease of cure when compared to the higher alkylalkoxysilanes (those with more than 14 carbon atoms in the alkyl portion) or phenyltrialkoxysilanes. The material of component (iii) is typically utilized in an amount ranging from about 9 to about 85 percent by weight, preferably 9 to 60 percent by weight.

In one embodiment of the present invention a cohydrolysis product of components (i) and (iii) can be utilized in preparing the ungelled reaction product. The cohydrolysis product can be prepared by mixing the two components and adding water in a controlled manner. Alternatively, the water for hydrolysis can be obtained as a result of the presence of a ketone type solvent. The ketone solvent reacts with the amine from (i) forming water and a ketimine.

In preparing a partial hydrolysis product, for example, from a nonfunctional organosilane such as alkylalkoxysilanes of formula (II) above, a controlled amount of water is utilized. Generally, the partial hydrolysis product will contain condensation product compounds having one or more siloxane linkages represented by the formula (V),

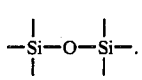
(III)

The hydrolysis and condensation reactions believed to be involved in the preparation of the partial hydrolysis products typically may be illustrated as follows:

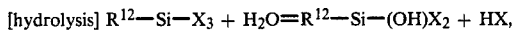

and

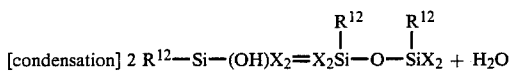

wherein $R^{12}$ and X are as defined in formula (II) above, X being an easily hydrolyzable group such as, for example, methoxy or ethoxy.

The amount of water typically used for preparing a partially hydrolyzed organosilicon-containing material such as nonfunctional organosilane, organosilicate or vinylalkoxysilane can be determined according to the following formula (IV), $$(E_{1,2} 33\ 0.5) + (E_{3,4} \times Z) = W,$$

wherein
  W represents the total moles of $H_2O$ employed calculated on the total equivalents of the easily hydrolyzable groups from organosilane compounds such as organosilicates, nonfunctional organosilanes, and vinylalkoxysilanes,
  $E_{1,2}$ represents the total number of equivalents of easily hydrolyzable groups from organosilane compounds containing one or two easily hydrolyzable groups,
  $E_{3,4}$ represents the total number of equivalents of easily hydrolyzable groups from organosilane compounds containing three or four easily hydrolyzable groups, and
  Z is a number in the range of from 0.023 to 0.43, preferably in the range of from 0.050 to 0.33, and more preferably in the range of from 0.080 to 0.23.
It is to be understood that one equivalent of the hydrolyzable groups corresponds to one mole of the hydrolyzable groups, and one equivalent of water corresponds to ½ mole of water.

Of course, it will be understood that the relative amounts of constituents in a partial hydrolysis product can be adjusted, for example, by distilling off a portion, as desired, of volatile constituents from the partial hydrolysis product.

It will be appreciated from the disclosure herein, that the partial hydrolysis product prepared utilizing such a controlled amount of water as determined by formula (IV) above, will contain a mixture of low molecular weight compounds which contain residual easily hydrolyzable groups. The partial hydrolysis product typically will contain greater than 5.0, and usually greater than 8.0, milliequivalents of residual easily hydrolyzable groups per gram of partial hydrolysis product. There is also the possibility that the ungelled partial hydrolysis products prepared utilizing a controlled amount of water as determined from formula (IV) above, also contain a small amount of silanol-type hydroxyl groups. However, such partial hydrolysis products generally will contain a ratio of residual easily hydrolyzable groups to silanol-type hydroxyl groups greater than 1.00, and typically greater than 3.00.

The partial hydrolysis of the aforedescribed material typically is conducted in the presence of from 0.01 to 20 percent by weight of a catalyst such as gamma-aminopropyl triethoxy silane, isophorone diamine, 2-amino-2-methyl-1-propanol, or the like. The percent by weight of catalyst is based on the total weight of the organosilicon-containing material. Preferred partial hydrolysis products typically contain an amount of easily hydrolyzable groups such that the ratio of the number of grams of the partial hydrolysis product to equivalents of the easily hydrolyzable groups in the partial hydrolysis product is in a range of from 40 to 300, usually in a range of from 50 to 200. In other words, the "hydrolyzable group equivalent weight" of the partial hydrolysis product typically is in a range of from 40 to 300, usually in a range of from 50 to 200.

In one preferred embodiment the aforedescribed ungelled reaction product of the claimed coating composition additionally comprises an ungelled resin composition, (iv), which will be described more fully below.

In another preferred embodiment, the present invention is directed to a coating composition which comprises an ungelled reaction product of
  (i) an amine having in a molecule thereof at least one amino hydrogen atom and at least one silicon atom directly bonded to a hydrolyzable group;
  (ii) a material containing at least one epoxide group;
  (iii) a material selected from vinylalkoxysilanes; nonfunctional organosilanes; organosilicates; and partial hydrolysis products thereof; and
  (iv) an ungelled resin composition comprising an organic polymer described in detail below.

Components (i), (ii) and (iii) have been described in detail above; therefore, they will not be discussed further at this juncture.

Component (iv) is an ungelled resin composition comprising an organic polymer having in a molecule thereof at least one group containing a silicon atom, said group selected from:

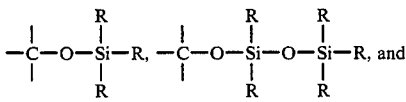

(A)        (B)

-continued

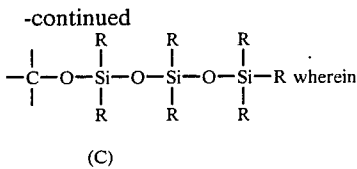

(C)

each R, which may be the same or different, represents: Y; hydrogen; a $C_1$-$C_{10}$ group joined to Si through an Si-C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, and/or a halo group; or a $OR^{13}$ group in which $R^{13}$ represents alkyl having at least 4 carbon atoms, aryl, alkylaryl, arylalkyl, aryloxyalkyl, or alkyloxyalkyl; wherein Y represents an easily hydrolyzable group; provided that the ungelled resin composition contains an amount of easily hydrolyzable Y moieties directly bonded to silicon atoms such that the ratio of the number of grams of said ungelled resin composition to equivalents of easily hydrolyzable Y moieties in the ungelled resin composition is in the range of from 40 to 667, preferably in a range of from 40 to 400, and more preferably in a range of from 40 to 200. In other words, an ungelled resin composition of the invention has a total content of Y moieties of from 25 milliequivalents to 1.5 milliequivalents, preferably of from 25 to 2.5 milliequivalents, more preferably of from 25 to 5.0 milliequivalents, per gram of ungelled resin composition.

In the aforesaid definition of R, it is to be understood that the $C_1$-$C_{10}$ group joined to Si through an Si-C linkage can be saturated or can contain aromatic and/or ethylenic unsaturation. It is preferred that for the moieties R, which are not Y, that not all of these moieties are phenyl.

The term "ungelled" has been described above in connection with the ungelled reaction product. Preferred ungelled resin compositions are those which are liquid at 25° C. in the presence of suitable solvents.

Examples of groups which can represent the easily hydrolyzable group Y have been described in detail, above, in the specification in connection with the amino component, (i). Of the above described examples of easily hydrolyzable groups Y, the groups

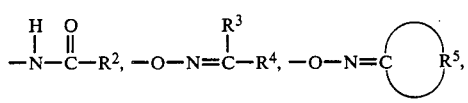

and the monohydroxy and/or cyclic $C_2$-$C_3$ residue of a 1,2- or 1,3-glycol as defined above, are less preferred than the hydrolyzable group $-OR^1$ as defined above, the groups

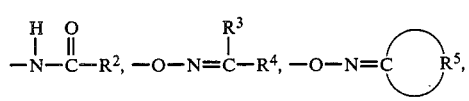

being much less preferred since they contribute to higher weight loss than desired for some applications when polymers containing these groups are cured; and their products upon cure tend to have lower vapor pressures than desired for some applications which may increase the curing times and/or temperatures of polymers.

In one preferred ungelled resin composition at least one R represents $-OR^1$ wherein $R^1$ is a $C_1$-$C_3$ alkyl group. In one more preferred ungelled resin composition at least one R is a methoxy group and at least one R is methyl.

An ungelled resin composition of the invention can be prepared, for example, by reacting a hydroxyl-functional acrylic resin with (a) an organosilicon-containing material containing at least 10 percent by weight of the organosilicon-containing material of a compound corresponding to the formula (H), $R-Si(OR^{14})_3$ wherein R is as defined for formulas (A) through (C) above, and $R^{14}$ independently represents a $C_1$-$C_3$ alkyl group, preferably at least one $OR^{14}$ group being methoxy; (b) an organosilicon-containing material comprising at least 10 percent by weight of said organosilicon-containing material of a compound corresponding to the formula

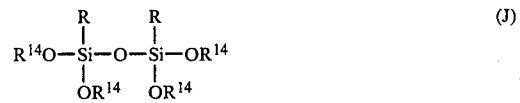

wherein R is as defined for formulas (A) through (C) above, and $R^{14}$ independently represents a $C_1$-$C_3$ alkyl group, preferably at least one $OR^{14}$ group being methoxy; (c) an organosilicon-containing material comprising at least 10 percent by weight of said organosilicon-containing material of a compound corresponding to the formula

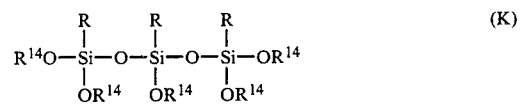

wherein R is as defined for formulas (A) through (C) above, and $R^{14}$ independently represents a $C_1$-$C_3$ alkyl group, preferably at least one $OR^{14}$ group being methoxy; (d) an organosilicon-containing material comprising a mixture containing at least 10 percent by weight of said organosilicon-containing material of a compound corresponding to the formula $R-Si(OR^{14})_3$ and at least 10 percent by weight of said organosilicon-containing material of a compound corresponding to the formula

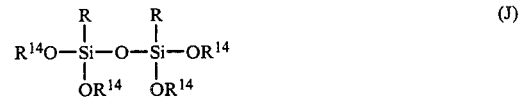

wherein R is as defined for formulas (A) through (C) above, and $R^{14}$ independently represents a $C_1$-$C_3$ alkyl group, preferably at least one $OR^{14}$ group being methoxy or (e) a partial hydrolysis product of a compound corresponding to the formula $R-Si(OR^{14})_3$ wherein R is as defined for formulas (A) through (C) above, and $R^{14}$ independently represents a $C_1$-$C_3$ alkyl group, preferably at least one $OR^{14}$ group being methoxy, and/or a combination thereof.

Examples of suitable organosilicon-containing materials for preparation of an ungelled resin composition of (iv) include but are not limited to organosilicates, nonfunctional organosilanes; functional organosilanes; partial hydrolysis products of each of the above; and mixtures and/or partially hydrolyzed mixtures of the above.

The organosilicates, nonfunctional organosilanes as well as their partial hydrolysis products, have been discussed in detail above.

Of the organosilicates corresponding to the formula (I), above, the tetra alkoxysilanes wherein x equals 0 in formula (I) are preferred. The tetraalkoxysilanes provide a high degree of functionality to the resin compositions of the invention and enhance the ease with which the compositions of the invention can be cured. Additionally, the tetraalkoxysilanes are readily available at low cost. Furthermore, they can be used to attach modifying groups such as those represented by $-OR^{13}$ in formula (I) above, an example of which is a sec-butoxy group. Of the examples of organosilicates described above, tetraethoxysilane is desirable. Although tetraethoxysilane is not as reactive as tetramethoxysilane, it is not as highly volatile as tetramethoxysilane nor as toxic to handle.

As used herein, a "functional organosilane" is intended to include materials corresponding to the formula, (M), $$F-G-SiX_3, \quad (M)$$

wherein

G represents an organo group containing from 2 to 10 carbon atoms,

X represents $-OR^1$,

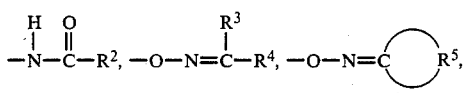

and the monohydroxyl and/or cyclic $C_2-C_3$ residue of a 1,2- or 1,3-glycol, wherein $R^1$ represents $C_1-C_3$ alkyl, preferably $C_1-C_2$ alkyl, and most preferably methyl, $R^2$ independently represents H or $C_1-C_4$ alkyl, $R^3$ and $R^4$ independently represent H, $C_1-C_4$ alkyl, $C_6-C_8$ aryl and $R^5$ represents $C_4-C_7$ alkylene, and F represents amino, polyamino, 1,2-epoxy, mercapto, cyano, allyl, vinyl, urethano, halo, isocyanato, ureido, imidazolinyl, acrylato, methacrylato, or a group corresponding to $-SiX_3$, wherein X is as defined above.

In accordance with the discussion of the distinction between nonfunctional organosilanes and functional organosilanes as these terms are used herein, groups defined by F above are considered to be the "functional" groups encompassed by the term "functional organosilane". It also should be understood that compounds such as vinyltrimethoxy silane, vinyltriethoxy silane, allyltrimethoxy silane and allyltriethoxy silane, which contain functional groups such as allyl and vinyl, while not literally corresponding to formula (M) above, are considered herein to fall within the meaning of functional organosilane. Some examples of functional organosilanes include gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatoproyltriethoxysilane, vinyltrimethoxysilane, vinyltriethoxysilane, allyltrimethoxysilane, allyltriethoxysilane, mercaptopropyltrimethoxysilane, mercaptoethyltrimethoxysilane, mercaptopropyltrimethoxysilane, glycidoxypropyltrimethoxysilane, glycidoxypropyltrimethoxysilane, 4,5-epoxycyclohexylethyltrimethoxysilane, ureidopropyltrimethoxysilane, ureidopropyltriethoxysilane, chloropropyltrimethoxysilane, chloropropyltrimethoxysilane, and

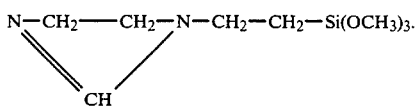

It will be appreciated that functional organosilanes containing mutually reactive functional groups such as 1,2-epoxy and amino, or amino and isocyanato, etc., or groups defined by F above which are reactive with groups defined by X above, should be employed in controlled amounts to prepare the resin compositions of the invention so as to avoid gelation or products of undesirably high viscosity.

Although the incorporation of the functional organosilanes (and/or partial hydrolysis products thereof) in the organosilicon-containing material may be desirable for some purposes, functional organosilanes tend to be costly. It has been found that, where desired, ungelled resin compositions of the invention can be prepared from the reaction of, for example, hydroxyl-functional acrylic resins with organosilicon-containing materials in which the amount of such functional organosilanes is minimized or even eliminated.

In one preferred embodiment of the invention the ungelled polymer of the invention is prepared by reacting a hydroxyl-functional acrylic resin with an organosilicon-containing material comprising at least 10 percent by weight of organosilicon-containing material of a compound corresponding to the formula (J) (a disiloxane) as defined above. Such an organosilicon-containing material can be prepared, for example, by the controlled hydrolysis of a trialkoxy silane compound corresponding to formula (H) above such as methyltrimethoxysilane employing a ratio of moles of the trialkoxy silane to moles of water ranging from 1.0:0.75 to 1.0:0.1, preferably ranging from 1.0:0.6 to 1.0:0.4. Such controlled hydrolysis will produce a hydrolysis product containing a mixture of compounds. The partial hydrolysis typically is conducted in the presence of from 0.01 to 20 percent by weight of a catalyst or coreactant such as gamma-aminopropyltriethoxysilane, isophorone diamine, 2,2,4-trimethyl-hexamethylene-1,6-diamine, 2,amino-2-methyl-1-propanol, tetrabutylammonium fluoride, isopropanolamine, or neopentanolamine. A preferred hydrolysis product produced from such controlled hydrolysis typically will contain at least 10 percent by weight of the disiloxane (see formula J) in combination with at least 10 percent by weight of the starting compound (see formula H) in addition to other compounds such as the trisiloxane (see formula K).

In another preferred embodiment of the invention, the ungelled polymer of the invention is prepared by reacting a hydroxyl-functional acrylic resin with an organosilicon-containing material comprising the partial hydrolysis product of a mixture containing from 1 to 10 moles of methyl trimethoxy silane, from 10 to 1 moles of methyl phenyl dimethoxy silane and from 10 to 1 moles of phenyl trimethoxy silane. The partial hydrolysis typically is conducted in the presence of a catalyst or coreactant such as gamma-aminopropyltriethoxysilane, isophorone diamine, 2,2,4-trimethylhexamethylene-1,6-diamine or 2-amino-2-methyl-1-propanol. The partial hydrolysis is conducted employing a controlled amount of water, for example, from 0.75 to 0.1 moles of water per mole of alkoxy silane groups. It has been found that often such partial hydrolysis products of methyltrimethoxysilane, methylphenyldimethoxysilane, and phenyltrimethoxysilane are more compatible with hydroxyl-functional acrylic resins than the partial hydrolysis product of methyl trimethoxy silane alone. Sometimes an alcohol such as methanol or ethanol is needed to render the partial hydrolysis product homogeneous.

As described above, an ungelled resin composition of the invention can be prepared, for example, by reacting a hydroxyl functional acrylic resin with organosilicon-containing materials as described above. Typically the hydroxyl-functional acrylic resin comprises an acrylic polyol.

Acrylic polyols include but are not limited to the known hydroxyl-functional addition polymers and copolymers of acrylic and methacrylic acids and their ester derivatives including but not limited to their hydroxyl functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, 5-butyl (meth)acrylate, 2-ethylhexyl (meth)acrylate, n-hexyl (meth)acrylate, cyclohexyl (meth)acrylate, 3,3j5-trimethylcyclohexyl (meth)acrylae, decyl (meth)acrylate, isodecyl (meth)acrylate, lauryl (meth)acrylate, stearyl (meth)acrylate, phenyl (meth)acrylate, and isobornyl (meth)acrylate.

Additional examples of compounds which may be employed in the preparation of hydroxyl-functional acrylic resins, or as the hydroxyl-functional acrylic resins, for reaction with organosilicon-containing material include: compounds produced by the reaction of lactones such as caprolactone with hydroxyl functional acrylic esters such as hydroxyethylacrylate and hydroxypropylacrylate; epoxy-esters produced by the reaction of fatty acids, especially monocarboxylic fatty acids, with ethylenically unsaturated epoxides such as glycidyl acrylate and glycidyl monomers such as those described previously herein with ethylenically unsaturated anhydride such as maleic anhydride in which the anhydride rings are reacted with a polyol such as a low molecular weight diol.

Where desired, various other unsaturated monomers can be employed in the preparation of hydroxyl-functional acrylic resins such as acrylic polyols, examples of which include: vinyl aromatic hydrocarbons such as styrene, alpha-methyl styrene, and vinyl toluene; vinyl acetate; vinyl chloride; and unsaturated epoxy functional monomers such as glycidyl (meth)acrylate. For convenience, the term "(meth)acrylate" has been used herein to denote either or both of the respective acrylate compound and the respective methacrylate compound. Suitable acrylic polyols for preparation of ungelled resin compositions have a molecular weight as determined by gel permeation chromatography using a polystyrene standard of from 600 to 50,000. Moreover, suitable acrylic polyols for preparation of the polymers of the invention have a hydroxyl equivalent weight of from 116 to 1,000.

The above examples of hydroxyl-functional acrylic resins should be considered to be merely illustrative or hydroxyl-functional acrylic resins which may be utilized for preparation of ungelled resin compositions of the invention. Other polyols, including but not limited to polyester polyols, polyether polyols and polyurethane polyols can also be used. These are fully described below in the specification.

When an ungelled polymer of the invention is prepared by reaction of an acrylic polyol and an organosilicon-containing material as described above, the acrylic polyol and the organosilicon-containing material are reacted typically under a blanket of a nonreactive gas such as nitrogen at a temperature ranging from about 50° C. to about 180° C. for 0.5 to 50 hours usually with removal by distillation of the low boiling volatile reaction product such as the volatile alcohol. If distillate is removed, a fractionating column may be used as a precaution to prevent removal of the starting materials. Depending on the vapor pressures of the starting materials, for example, where materials having high vapor pressures are employed, the reaction can be conducted under pressure.

Often the starting materials do not form a homogeneous mixture at ambient temperature to begin with; however, as the reaction is carried out, the materials usually form a homogeneous mixture as the reaction proceeds. Moreover, materials such as gamma-glycidoxypropyl trimethoxy silane, QP8-5314 (a mixture believed to contain 25 mole percent methylphenyldimethoxysilane and 75 mole percent phenyltrimethoxysilane available from Dow Corning), and N-methylpyrrolidone can be utilized in the reaction mixture to aid in rendering the starting materials compatible.

Depending on the choice of reactants and optionally catalysts, the reaction may be conducted under milder or more severe conditions of time and temperature. For example, the reaction may be conducted at a temperature such as 80° C. for about 1 hour with removal of alcohol. Or where the reaction is carried out without a catalyst, the reaction may be conducted, for example, at 175° C. for 3 or more hours.

When desired, a limited amount of water can be employed to hydrolyze an unhydrolyzed organosilicon-containing material prior to, during, or even after reaction of the organosilicon-containing material with the hydroxyl-functional acrylic resin.

Where water is employed in the reaction mixture, the amount of water must be controlled because water is a reactant in the reaction mixture. Moreover, when water is present as a separate phase, a water soluble solvent is often used to make the mixture homogeneous. Additionally, a moisture-free atmosphere usually is employed because uncontrolled hydrolysis of the organosilicon-containing material during product preparation is not desired and also in order to minimize the water content in the ungelled resin product.

Depending on the particular choice of reactants, the reaction between the organosilicon-containing material and hydroxyl-functional acrylic resin may be sluggish, and where desired, a catalyst may be utilized to speed up the reaction. Examples of such catalysts include: acids such as paratoluenesulfonic acid, tin-containing compounds such as butylstannoic acid, dibutyltin oxide, stannous octoate and dibutyltin dilaurate; titanates such as tetraisopropyl titanate and tetrabutyltitanate; amino compounds such as aminopropyltriethoxysilane, isopropanol amine, 2-amino-2-methyl-1-propanol, 2-amino-2-methyl-1-propanol and the like. Of course, where functional organosilanes as described previously herein are employed for organosilicon-containing material, the choice of catalyst will be in part governed by the functional groups present so as to avoid gelation. Moreover, the extent of reaction should be controlled so as to avoid gelation. The extent of reaction can be monitored by following the amount of product HY given off during the reaction. When catalysts are utilized in the preparation of the acrylic resin compositions of the invention, reaction temperatures lower than about 120 degrees C are feasible.

When an ungelled acrylic resin composition of the invention is prepared from the reaction of an organosilicon-containing material as described above and a hydroxyl-functional acrylic resin such as an acrylic polyol, the amounts by weight of the organosilicon-containing material and the hydroxyl-functional acrylic resin for preparation of the ungelled resin composition may vary. Depending on the particular choice of hydroxyl-functional acrylic resin and organosilicon-containing material, the mole ratio of hydroxyl moieties (i.e., C—OH) from the hydroxyl-functional acrylic resin to hydroxyl-reactive Y moieties, for example such as lower alkoxy moieties, from the organosilicon-containing material may vary. However, an amount of hydroxyl-functional acrylic resin and an amount of organosilicon-containing material generally will be chosen and the extent of reaction controlled such that the ungelled resin composition will contain an amount of the Y moieties such that the ratio of the number of grams of ungelled resin composition to equivalents of the Y moieties in the ungelled resin composition is in a range of from 40 to 667, preferably in a range of from 40 to 400, and more preferably in a range of from 40 to 200. A useful guide is to choose the hydroxyl-functional acrylic resin and organosilicon-containing starting materials so as to provide a ratio of equivalents of hydroxyl moieties from the hydroxyl-functional acrylic resin to equivalents of hydroxyl-reactive Y moieties, such as lower alkoxy moieties, from the organosilicon-containing material ranging from 1:2 to 1:100. Typically a ratio of equivalents of 1:3 to 1:20 is employed. It will be understood that 1 equivalent of hydroxyl moieties equals 1 mole of hydroxyl moieties and 1 equivalent of the reactive Y moieties equals 1 mole of the hydroxyl moieties and 1 equivalent of the reactive Y moieties equals 1 mole of the hydroxyl-reactive Y moieties. An ungelled resin composition of the invention will contain a total content of Y moieties of from 25 to 1.5 milliequivalents, preferably of from 25 to 2.5 milliequivalent, more preferably of from 25 to 5.0 milliequivalents, per gram of ungelled resin composition. Moreover, typically the content of hydroxyl moieties (i.e., C—OH) in the ungelled resin reaction product from the hydroxyl-functional acrylic resin will range from 0 milliequivalents to 10 milliequivalents per gram of reaction product, usually from 0 to 5 milliequivalents per gram of reaction product. As used herein, one milliequivalent of either the hydroxyl moiety (i.e., C—OH) or the moiety Y bonded to Si is equal to one millimole.

In a preferred embodiment of the present invention the coating composition of the present invention comprises at least 15 percent by weight of (a), the ungelled reaction product which has been described above as a curative for another material, (b), different from the ungelled reaction product, (a) and containing functionality capable of cocuring with (a).

The material which contains functionality capable of cocuring with the ungelled reaction product can be selected from a wide variety of materials. Suitable materials include those which contain hydroxyl functionality, epoxide functionality, amine functionality, acrylate functionality, organosilane functionality or mixtures thereof. Moreover, the mechanism of cure or crosslinking will vary depending on the functionality of the (b) material. For example, the acrylate functional materials can cocure with the ungelled reaction product by the reaction between the amine groups of the reaction product and the acrylate unsaturation. This reaction of an amine group with a (meth)acrylyl group is often referred to as a Michael addition. The epoxide functional materials can cocure by reaction between the amine of the ungelled reaction product and the epoxy groups; the hydroxyl functional materials can react with the silane groups from the ungelled reaction product through the hydroxyl groups. Moisture cure can proceed by reaction of hydrolyzable silane groups to form polysiloxanes. A combination of any of the above cure mechanisms can occur. Moreover, ungelled reaction products can be prepared with an excess of epoxy component such that these products can be cocured with amine functional materials. The specific choice of material for component (b) is largely dependent on the particular area of application for the coating composition. Each material has its own preferred aspects depending on the application area.

It should be understood that all of the aforesaid crosslinking reactions are capable of proceeding at ambient temperature or slightly elevated temperature.

Suitable hydroxyl functional materials include a variety of polyols. Examples of the many suitable polyols include acrylic polyols, polyester polyols, polyurethane polyols and polyether polyols.

Examples of polyether polyols are polyalkylene ether polyols which include those having the following structural formula:

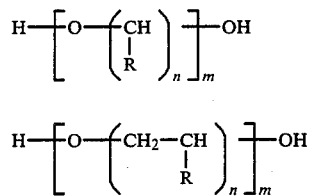

where the substituent R is hydrogen or lower alkyl containing from 1 to 5 carbon atoms including mixed substituents, and n is typically from 2 to 6 and m is from 10 to 100 or even higher. Included are poly(oxytetramethylene) glycols, poly(oxyethylene) glycols, poly(oxy-1,2-propylene) glycols and the reaction products of ethylene glycol with a mixture of 1,2-propylene oxide and ethylene oxide.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is by reacting a polyol with an alkylene oxide, for example, ethylene or propylene oxide, in the presence of an acidic or basic catalyst.

Polyester polyols can also be used in the invention. Polyester polyols can be prepared by the polyesterification of an organic polycarboxylic acid or anhydride thereof with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactonediol, for example, the reaction product of epsilon-caprolactone and ethylene glycol, hydroxy-alkylated bisphenols, polyether glycols, for example, poly(oxytetramethylene) glycol and the like. Polyols of higher functionality can also be used. Examples include trimethylolpropane, trimethylolethane, pentaerythritol and the like, as well as higher molecular weight polyols such as those produced by oxyalkylating lower molecular weight polyols.

The acid component of the polyester consists primarily of monomeric carboxylic acids or anhydrides having 2 to 36 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid, decanoic acid, dodecanoic acid, and other dicarboxylic acids of varying types. The polyester may include minor amounts of monobasic acids such as benzoic acid, stearic acid, acetic acid, hydroxystearic acid and oleic acid. Also, there may be employed higher polycarboxylic acids such as trimellitic acid and tricarballylic acid. Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsiloncaprolactone and a polyol. The product of a lactone with an acidcontaining polyol can also be used.

In addition to the polyether and polyester polyols, hydroxy-containing acrylic polymers or acrylic polyols can be used. Acrylic polyols have been described in detail above, in connection with the preparation of the ungelled resin composition of (iv), thus they will not be discussed here.

Besides the above-mentioned polymeric polyols, polyurethane polyols can also be used. These polyols can be prepared by reacting any of the above-mentioned polyols with a minor amount of polyisocyanate (OH/NCO equivalent ratio greater than 1:1) so that free hydroxyl groups are present in the product. In addition to the high molecular weight polyols mentioned above, mixtures of both high molecular weight and low molecular weight polyols may be used. Among the low molecular weight polyols are diols and triols such as aliphatic polyols including alkylene polyols containing from 2 to 18 carbon atoms. Examples include ethylene glycol, 1,4-butanediol, 1,6-hexanediol; cycloaliphatic polyols such as cyclohexanedimethanol and hydrogenated bisphenol A. Examples of triols include trimethylolpropane and trimethylolethane. Also useful are polyols containing ether linkages such as diethylene glycol and triethylene glycol. Also acid-containing polyols such as dimethylolpropionic acid can also be used.

The organic isocyanate which is used to prepare the polyurethane polyols can be an aliphatic or an aromatic isocyanate or a mixture of the two. Also, diisocyanates are preferred although higher polyisocyanates and monoisocyanates can be used in place of or in combination with diisocyanates. Where higher functionality polyisocyanates are used, some reactive material to reduce the functionality of the polyisocyanate may be used, for example, alcohols and amines. Also, some monofunctional isocyanate may be present. Examples of suitable higher polyisocyanates are 1,2,4-benzene triisocyanate and polymethylene polyphenyl isocyanate. Examples of suitable monoisocyanates are butyl isocyanate, cyclohexyl isocyanate, phenyl isocyanate and toluene isocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha,alpha-xylylene diisocyanate and 4,4'-methylene-bis-(cyclohexyl isocyanate).

The epoxide functional materials are those materials having a 1,2 epoxide group present in the molecule. Preferred are the diepoxides. Hydroxyl groups may also be present and often are. Polyepoxides contain more than one 1,2-epoxy group per molecule. In general, the epoxide equivalent weight will range from about 100 to about 4000. These Polyepoxides are saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenyl)-1,1-ethane; bis(2-hydroxynaphenyl)-methane; and 1,5-hydroxynaphthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well know in the art.

Useful polyepoxides also include those containing oxyalkylene groups in the epoxy molecule. Another class of polyepoxides consists of the epoxy novolac resins. These resins are obtained by reacting an epihalohydrin with the condensation product of aldehyde and monohydric or polyhydric phenols. A typical example is the reaction product of epichlorohydrin with a phenolformaldehyde condensate.

Another group of epoxide containing materials includes acrylic copolymers containing copolymerized glycidyl acrylate or methacrylate or allyl glycidyl ether units. These acrylic copolymers can be prepared by the reaction of alkyl esters of alpha,beta unsaturated mono- or di-carboxylic acids with either glycidyl acrylate or methacrylate. Other glycidyl containing copolymerizable monomers such as diglycidyl itaconate and diglycidyl maleate also can be used. These monomers can be optionally copolymerized in the presence of other copolymerizable monomers such as vinyl aromatic compounds, such as styrene or vinyl toluene, and also acrylonitrile or methacrylonitrile.

Suitable organosilane functional materials have already been described above. These include nonfunctional organosilanes, organosilicates; partial hydrolysis products thereof, and mixtures thereof.

Suitable acrylate functional materials include polyol polyacrylates. There are a variety of polyol polyacrylates which can be utilized such as hydrocarbonpolyol polyacrylates, saturated polyesterpolyol polyacrylates, alkydpolyol polyacrylates, amide or polyamidepolyol polyacrylates, urethanepolyol polyacrylates, polyurethanepolyol polyacrylates, etherpolyol polyacrylates, and polyetherpolyol polyacrylates.

Hydrocarbon polyol polyacrylates can be derived from the reaction of an acrylic acid with a polyhydric material. Polyhydric materials include the aliphatic diols such as ethylene glycol, 1,2-propanediol, 1,3-propanediol, 2,2,4-trimethyl-1,3-pentanediol, 2,2-dimethyl-1,3-propanediol, 1,2-butanediol, 1,4-butanediol, 1,3-butanediol, 1,5-pentanediol, 1,10-decanediol; 2,2-dimethyl-3-hydroxypropyl 2,2-dimethyl-3-hydroxypropionate, and ester diols formed from one mole of a diol and at least one mole of a lactone, e.g., butyrolactone or caprolactone; diols containing a cyclic structure such as 1,4-cyclohexanedimethanol, p-xylylene glycol, bisphenol A, hydrogenated bisphenol A, and 1,4-cyclohexane diol, triols such as glycerol, trimethylol ethane, trimethylol propane, and 1,2,6-hexane triol; and tetraols such as pentaerythritol. The triols are preferred and the diols are most preferred polyhydric materials. The aforementioned acrylic acid is reacted with the polyhydric material in an essentially equivalent ratio or a slight excess so as to produce a material of the formula:

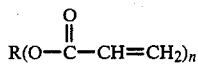

where R is the residue of the polyhydric material and n is at least 2.

Saturated polyesterpolyol polyacrylates can be derived from the reaction of a dicarboxylic acid with a polyhydric material which is further reacted with an acrylic acid. Suitable saturated dicarboxylic acids (which for purposes herein are defined to include those dicarboxylic acids where the only unsaturation occurs in the aromatic nuclei) useful in this reaction are adipic acid, sebacic acid, succinic acid, phthalic acid, isophthalic acid and azelaic acid. Unsaturated dicarboxylic acid such as maleic acid, fumaric acid, citraconic acid, and itaconic acid can be used, but only in minor components. Anhydrides of the aforementioned acids, where they exist, are intended to be embraced by the term "acid." Suitable polyhydric materials are described above.

Saturated polyesterpolyol polyacrylates can also be derived from the reaction of a hydroxyalkyl acrylate with lactones. Such adducts or the hydroxyalkyl acrylates, per se, can then be reacted with dicarboxylic acid to give other suitable polyester acrylates. Hydroxyalkyl acrylates wherein the alkyl group contains from 2 to 10 carbon atoms are preferred with examples thereof being 2-hydroxyethyl acrylate, 2-hydroxypropyl acrylate, 3-hydroxypropyl acrylate, 2-hydroxybutyl acrylate, and 6-hydroxynonyl acrylate. Lactones are exemplified by epsilon-caprolactone, epsilonmethylcaprolactone, and butyrolactone.

Alkydpolyol polyacrylates are derived from the reaction of a hydroxyalkyl acrylate (such as described above with respect to the polyester polyol acrylates) with a carboxyl-rich alkyd resin. Alkyd resins are well known and can be considered polyesters of polyhydric materials and polycarboxylic acids chemically combined with various drying, semi-drying and nondrying oils in different proportions. Thus, for example, the alkyd resins are made from polycarboxylic acids such as phthalic acid, isophthalic acid, succinic acid, adipic acid, azelaic acid, sebacic acid as well as from anhydrides of such acids, where they exist. The polyhydric materials which are reacted with the polycarboxylic acid include glycerol, trimethylolethane, trimethylolpropane, pentaerythritol, sorbitol, manitol, ethylene glycol, diethylene glycol and 2,3-butylene glycol.

The alkyd resins are produced by reacting the polycarboxylic acid and the polyhydric material together with a drying, semi-drying or nondrying oil in proportions depending upon the properties desired. The oils are coupled into the resin molecule by esterification during the manufacturing and become an integral part of the polymer. The oil is fully saturated or predominately unsaturated. The fully saturated oils tend to give a plasticizing effect to the alkyd resulting in durable films, whereas the predominately unsaturated oils tend to crosslink and dry with oxidation to give more crosslinked films. Suitable oils include coconut oil, fish oil, linseed oil, tung oil, castor oil, cottonseed oil, safflower oil, soybean oil, and tall oil. Various proportions of the polycarboxylic acid, polyhydric material and oil are used to obtain alkyd resins of various properties.

Urethanepolyol polyacrylates are derived from the reaction of an isocyanate with a hydroxyalkyl acrylate. The isocyanate is a polyisocyanate. Several different polyisocyanates are useful. Examples include aliphatic, cycloaliphatic or aromatic compounds having two or more isocyanate groups. Illustrative compounds are 1,4-tetramethylene diisocyanate; 1,6-hexamethylene diisocyanate, 2,2,4-trimethyl-1,6-diisocyanato hexane, 1,10-decamethylene diisocyanate; 1,4-cyclohexylene diisocyanate; 4,4'-methylene bis-(isocyanato cyclohexane); p-phenylene diisocyanate; isophorone diisocyanate; 4,4'-bisphenylene diisocyanate; 4,4'-methylene bis(diphenyl isocyanate); 1,5-naphthalene diisocyanate; and 1,5-tetrahydronaphthalene diisocyanate. Examples of hydroxyalkyl acrylate compounds reacted with the isocyanate include 2-hydroxyethyl acrylate, 2-hydroxypropyl acrylate, 3-hydroxypropyl acrylate, trimethylolpropane mono-and-diacrylate, and any of the aforedescribed acrylates which has been modified by reaction with a lactone. Generally, equivalent amounts of the hydroxyalkyl acrylates and isocyanates reactants are reacted together.

Polyurethanepolyol polyacrylates are derived from the reaction of a polyurethane having free isocyanate groups with a hydroxyalkyl acrylate or are derived from a polyurethane having free hydroxyl groups with acrylic acid. The polyurethanes are made by reacting a Polyisocyanate (as described above) with a polyhydric material (also as described above). The resultant product is a polyurethane having free isocyanate or free hydroxyl groups dependent on the relative amounts of reactants. Those polyurethanes having free isocyanate groups are reacted with a hydroxyalkyl acrylate, as described above, while those polyurethanes having free hydroxyl groups are reacted with acrylic acid or isocyanate functional acrylates like isocyanatoethyl acrylate or toluenediisocyanate half-blocked with hydroxyethyl acrylate. Less than stoichiometric amounts of the acrylate or acrylic acid can be used so as to have free isocyanate or hydroxyl groups available; however, nearly stoichiometric amounts of reactants are generally preferred. Also, if the isocyanate-containing material is reacted with acrylic acid, the resultant useful product would be an acrylamide with the segment structure

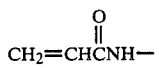

With respect to the production of the urethanepolyol and polyurethanepolyol polyacrylates, the aliphatic isocyanate reactants are used where a film with good weather durability is ultimately desired. Aromatic isocyanates are used as a reactant when tough films and/or lower cost films are ultimately desired.

Amidepolyol polyacrylates and polyamidepolyol polyacrylates are also useful. One method of obtaining an amide polyol acrylate is by reacting a carboxylic acid, e.g., formic acid with a dialkanolamine and then reacting that product with acrylic acid. The polyamide polyol acrylates are made by reacting a polyamide having carboxyl or carboxylate groups with a hydroxyalkyl acrylate. The polyamides are made by reacting a diamine with a dicarboxylic acid as illustrated in the preparation of the polyester polyol acrylates. The relative amounts of the reactants is adjusted to ensure free carboxy groups.

Etherpolyol polyacrylates which are useful can be made by different methods. One method involves reacting an ether-containing polyol with acrylic acid. The ether polyol can be diethylene glycol, dipropylene glycol, dibutylene glycol or can be made by reacting a suitable polyhydric material as described above with a monoepoxide such as butyl glycidyl ether, octyl glycidyl ether, allyl glycidyl ether, phenyl glycidyl ether, 1,2-butylene oxide, and styrene oxide.

Etherpolyol polyacrylates can also be derived from the reaction of (1) an acrylic acid with (2) a polyglycidyl ether of a polyphenol or polyhydric alcohol. Any polyglycidyl ether of a polyphenol or a polyhydric material can be used. Preferred are the polyglycidyl ethers of a polyphenol such as bisphenol A. Other polyglycidyl ethers are obtained by etherification of a polyphenol with epichlorohydrin or dichlorohydrin in the presence of an alkali. The phenolic compound can be 2,2-bis(4-hydroxyphenyl)propane; 4,4'-dihydroxybenzophenone; 1,1-bis(4-hydroxyphenyl)ethane; and 1,5-dihydroxynaphthalene. Similar polyglycidyl ethers of polyhydric alcohols are derived from such polyhydric alcohols as ethylene glycol, diethylene glycol, triethylene glycol, 1,2-propylene glycol, 1,4-butylene glycol, 1,5-pentanediol and trimethylolpropane. Generally, equivalent amounts of the acrylic acid and polyglycidyl ethers are used.

Polyetherpolyol polyacrylates can be made by reacting a polyether polyol with acrylic acid. Examples of polyether polyols have been described above in the specification.

Amine functional materials include isophoronediamine, trimethylhexanediamine, dimer acid diamine, or the product from diepoxides reacted with primary amines, aminopropyltrialkoxysilanes or aminoethylaminopropyltrialkoxysilanes that have reactive amino hydrogens.

The material which contains functionality capable of cocuring with the ungelled reaction product is generally utilized in an amount ranging from about 10 percent by weight to about 85 percent by weight, the percentages being based on the total weight of the ungelled reaction product and the material capable of cocuring with it.

It should also be understood that the reaction product of the present invention includes some proportion of unreacted component (iii) starting material as well. The presence of the unreacted material affects the film properties of the ultimate cured coating composition. For example, the presence of unreacted methyltrimethoxysilane monomer in the reaction product has a tendency to result in harder cured films. Also, when the ungelled reaction product is utilized as a curative for another material containing functionality capable of cocuring with it; it should be understood that in the presence of additional starting materials, additional ungelled reaction product can form in situ. This "in situ" formed material is considered as part of the at least 15 percent of ungelled reaction product which is required to be present in the coating composition.

Coating compositions of the present invention can be utilized as one package compositions or as two package compositions. As two packs, one package comprises the ungelled reaction product which has been described above and the second pack comprises the material containing functionality capable of cocuring with the ungelled reaction product. Additives and other materials described below can be added to either package as desired. The two packages are simply mixed together at the time of use. It should be understood, of course, that the ultimate coating composition contains at least 15 percent by weight of the ungelled reaction product. The pot life of the one package coating compositions can be enhanced by the addition of materials such as alcohols such as methanol and/or other materials which easily hydrolyze so as to act as scavengers for water which may be present in the composition.

The coating compositions of the present invention optionally can contain cure promoting catalysts such as tin naphthenate, dibutyltin dilaurate, dibutyltin oxide, and basic nitrogen containing compounds such as gamma-aminopropyltriethoxy silane, amine alcohols such as 2-amino-2-methyl-1-propanol and diamines such as isophorone diamine.

The claimed coating compositions can be pigmented or unpigmented. Suitable pigments include titanium dioxide, talc, zinc oxide, magnesium oxide or magnesium carbonate. Organic pigments can also be utilized as well as metallic pigments. Mixtures of pigments can also be utilized.

The coating compositions can also be formulated with a variety of organic solvents such as the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether; mono- and dialkyl ethers of diethylene glycol such as diethylene glycol monoethyl ether and diethylene glycol diethyl ether; ketones such as methyl ethyl ketone, hydrocarbons such as toluene and xylene and mixtures thereof.

The coating compositions can also contain a variety of conventional additives such as flow control agents, surfactants, plasticizers, ultraviolet light stabilizers and absorbers and fungicides.

Also, other modifying resins can be present in the coating composition depending upon the desired ultimate physical properties, for example, melamine formaldehyde condensates, thermoplastic acrylics and polyesters as well as cellulosic compounds such as nitrocellulose, acrylcellulose, cellulose acetate butyrate, cellulose acetate proprionate, and ethylcellulose.

The claimed coating compositions can be applied to a variety of substrates including metals, paper, plastics and glass and by a variety of methods including spraying, brushing, dipping and roll coating.

The coating compositions of the present invention can be cured in a relatively short period of time to provide films that have good early properties which allow for handling of the coated objects without detrimentally affecting the film appearance and which ultimately cure to films which exhibit excellent hardness, solvent resistance and impact resistance. For example, the claimed coating compositions can dry under ambient conditions to a dust free or tack free state in about 30 minutes. Thereafter, they will continue to cure completely under ambient conditions in from about, for example, 16 hours to about 1 week. Alternatively, for example, the coating compositions can be force-dried by baking for about 15 minutes at about 135° F. (57° C.) to achieve a tack free state and thereafter cured completely under ambient conditions for about one week.

The following examples are illustrative of the invention and are not meant to limit it to their details.

EXAMPLE I

This example illustrates the preparation of an ungelled reaction product according to the present invention.

| Charge | Ingredients | Parts by Weight (grams) |
| --- | --- | --- |
| I | A-163[1] silane | 816 |
|   | DRH-151[2] epoxy | 1,320 |
| II | A-1100[3] silane | 1,326 |

[1] Methyltrimethoxysilane which is commercially available from Union Carbide.
[2] The diglycidyl ether of fully hydrogenated bisphenol A commercially available from Shell Chemical.
[3] Gamma-aminopropyltriethoxysilane commercially available from Union Carbide.

A reactor vessel equipped with thermometer, stirrer, condenser, addition funnel and nitrogen inlet tube was charged with Charge (I) which had been premixed. The mixture was heated to 50° C. and then Charge (II) was added gradually over approximately a one and one-half hour period. The reaction mixture was maintained at this temperature for about eight hours, and allowed to stand at room temperature overnight. The reaction mixture was then refluxed for approximately three and one-half hours. The resultant product had a viscosity of 4.4 seconds using a Gardner-Holdt viscosity tube, an amine equivalent weight of 588 and epoxy equivalent weight of greater than 20,000.

EXAMPLE II

This example is similar to Example I in that it illustrates the preparation of an ungelled reaction product according to the present invention with the exception that a different epoxide containing material was utilized.

| Charge | Ingredients | Parts by Weight (grams) |
| --- | --- | --- |
| I | A-163 silane | 2,504 |
|   | A-1100 silane | 4,069 |
| II | EPON 828 epoxy[4] | 3,425 |
| III | methanol | 262 |

[4] The diglycidyl ether of bisphenol A commercially available from Shell.

A reactor vessel equipped with thermometer, stirrer, condenser, and nitrogen inlet tube was charged with Charge (I), which had been premixed. The mixture was heated to 60° C., and then Charge (II) was added gradually over approximately a two hour period. The reaction mixture was maintained at a temperature of between about 50° C. and about 70° C. for approximately five and one-half hours. Subsequently, Charge (III) was added and the mixture held at a temperature of 60° C. for three hours before allowing it to cool to room temperature. The resultant product had a stokes viscosity of 2.0, an epoxy equivalent weight of infinity and a total solids content of 68 percent measured for 1 hour at 110° C.

EXAMPLE III

This Example illustrates the preparation of a coating composition according to the present invention.

| Charge | Ingredients | Parts by Weight (grams) |
| --- | --- | --- |
| I | silane oligomer[5] | 9142 |
|   | A-1100 silane | 1086.2 |
| II | EPON 828 epoxy | 916 |
| III | acrylic polyol[6] | 6358.8 |

| Charge | Ingredients | Parts by Weight (grams) |
|---|---|---|
| IV | methanol | 277.2 |

[5]This oligomer was prepared by the partial hydrolysis of 114.49 moles of methyltrimethoxysilane with 63.0 moles of deionized water in the presence of 0.71 moles of gamma-aminopropyltriethoxysilane.
[6]This polyol was prepared from 30 percent methyl methacrylate, 25 percent styrene, 19 percent butyl methacrylate, 12 percent 2-ethylhexyl acrylate; and 14 percent 2-hydroxyethyl acrylate in a solvent mixture of toluene, xylene and VM & P naptha. The polyol had a hydroxyl value of 40.2, a stokes viscosity of 32.0, and a total solids content of 59 percent measured for one hour at 150° C.

A reactor vessel equipped with stirrer, thermometer, condenser, addition funnel, and nitrogen inlet tube was charged with Charge (I), which had been premixed. The mixture was heated to 50° C. and then Charge (II) was added over a thirty minute period. The mixture was held at 60° C. for thirty minutes, and then it was heated to reflux for three hours. Subsequently, the reaction mixture was cooled to less than 60° C. and Charge (III) was added. Next, the mixture was heated to 90° C., distilled to a Gardner-Holdt viscosity of 3.4 seconds and cooled. The mixture was held at 54°-58° C. until a viscosity of 4 to 5 seconds using a Gardner-Holdt viscosity tube was attained. Finally the reaction mixture was cooled to 60° C., and Charge (IV) was added. The resultant product had a total solids content of 60 percent measured for 1 hour at 110° C., a stokes viscosity of 2.8, an amine equivalent weight of 0.368, and an epoxy equivalent weight of infinity.

The coating composition was formulated from 186.6 grams of the above product; 2.0 grams of a silicone fluid solution [0.5 percent by weight solution of Dow Corning 200 silicone fluid (100 centistokes) in xylene]; 1.5 grams of a mar and slip aid commercially available from BYK-Mallinkrodt as BYK 301; 1.5 grams of a defoamer commercially available from BYK-Mallinkrodt as BYK 141; and 0.7 grams of dibutyltin dilaurate.

The coating composition was spray applied onto a 4 inch X 6 inch cherry wood panel and allowed to flash at room temperature for one hour. The panel was baked for 15 minutes at 135° F. (57° C.) and allowed to cool. The panel was then allowed to stand at ambient temperature for one week. The resultant film had a 3H pencil hardness determined as is described infra.

EXAMPLE IV (Part I)

In this part of the example an ungelled reaction product was prepared which was then blended with a polyol, catalyst and solvent to form a series of coating compositions in Part II.

| Charge | Ingredients | Parts by Weight (grams) |
|---|---|---|
| I | A-163 silane | 136 |
|   | EPON-1001 epoxy[7] | 500 |
|   | methanol | 64 |
| II | A-1100 silane | 221 |
| III | xylene | 100 |

[7]This material is similar to EPON 828 epoxy set forth in footnote 4 except that it has a higher molecular weight and is hydroxyl functional. The molecular weight of EPON 1001 is about 1000 whereas the molecular weight of EPON 828 is about 376.

A reactor vessel equipped with thermometer, stirrer, condenser, and nitrogen inlet tube was charged with Charge (I) which had been premixed and brought to a temperature of 70° C. The mixture was allowed to reflux, with cooling to 50° C. Subsequently, the temperature was briefly raised to 70° C. once again in order to completely melt some of the starting ingredients which remained in solid form. After the ingredients were completely melted, the temperature was brought to 50° C. and Charges (II) and (III) were quickly added. The reaction mixture was maintained at approximately 50° C. for about eight hours. Some gel particles were formed, therefore, 50 grams of methanol were added and the mixture heated to 50° C. for about a one-hour period. Subsequently, an additional 50 grams of methanol were added. The resultant ungelled product had a stokes viscosity of 38.7 and a total solids content of 64.1 percent measured for one hour at 110° C. The product eventually gelled after two weeks at ambient temperature.

(Part II)

In this part of the Example, the ungelled reaction product of Part I was utilized in preparing a series of coating compositions. The reaction product was utilized at a total solids content of 75 percent. Composition A contained 70 percent of the reaction product while compositions B and C contained 80 percent and 90 percent, respectively.

| | Parts by Weight (Grams) | | |
|---|---|---|---|
| Ingredients | Composition A | Composition B | Composition C |
| Reaction product of Part I | 14 | 16 | 18 |
| urethane modified polyester[8] polyol | 6 | 4 | 2 |
| dibutyltin dilaurate | 0.2 | 0.2 | 0.2 |
| methyl isobutyl ketone | 4 | 4 | 4 |

[8]The urethane modified polyester polyol was prepared from 49.84 percent neopentyl glycol hexahydrophthalate; 25.67 percent trimethyl hexamethylene diisocyanate; and 24.49 percent 1,6-hexanediol at 80 percent resins solids in methyl isobutyl ketone and had a viscosity of 23 stokes. The hydroxyl value was 80.73.

Each of the compositions was prepared by combining the ingredients together with mild agitation. Each of the compositions was drawn down using a 6-mil drawbar on two sets of cold rolled steel panels. One set of panels was flashed at room temperature for 20 minutes and, subsequently baked for 15 minutes at 135? F. (57? C.). The other set of panels was baked at 120° F. (49° C.) for 16 hours. All of the panels were evaluated for pencil hardness and in addition, the panels which were baked for 16 hours were evaluated for resistance to direct impact according to ASTM D2784 using 80 inch pounds. The results are indicated below.

| | Room Temp. Flash + 15 min. at 135° F. (57° C.) | 120° F. (49° C.) for 16 hours | |
|---|---|---|---|
| Composition | Pencil Hardness* | Pencil Hardness* | Impact** |
| A | less than B | greater than B | Pass |
| B | less than B | greater than B | Pass |
| C | less than B | greater than B | Fail |

*Pencil hardness was a measure of the resistance of the coating to a pencil indentor. The hardness scale is as follows beginning with 4B which indicates a relatively soft coating and measuring to 10H which indicates a relatively hard coating: 4B, 3B, 2B, B, HB, F, H, 2H, 3H, . . . up to 10H
**A pass rating indicates that no visible cracking or adhesion failure was observed. A fail rating indicates that some visible cracking or adhesion loss was observed.

EXAMPLE V

In this Example an epoxy functional acrylic polymer was cocured with the ungelled reaction product of Example I, above, to form a cured film.

| Charge | Ingredients | Parts by Weight (grams) |
|---|---|---|
| I | aromatic solvent[9] | 800 |
| II | 2-ethylhexyl methacrylate | 500 |
|  | glycidyl methacrylate | 500 |
| III | ethanol | 150 |
|  | hydrogen peroxide (50 percent in $H_2O$) | 36 |

[9]An aromatic petroleum solvent having a boiling point between 150° C. and 170° C.

A suitably equipped reactor vessel was charged with (I) and heated to a temperature of 135° C. Charges (II) and (III) were then added over a period of approximately six hours and fifteen minutes. The reaction mixture was held at a temperature of 135° C. for a two-hour period and then allowed to cool to room temperature. The resultant polymer was hazy in appearance; it had an epoxy equivalent weight of 511 and a total solids content of 52.4 percent measured for one hour at 110° C.

A coating composition was prepared by blending together 25 parts by weight of the aforedescribed epoxy functional acrylic polymer and 75 parts by weight of the ungelled reaction product of Example I, above. The coating composition was drawn down on two aluminum panels at a dry film thickness of about 1.5 mils. One panel was baked for 30 minutes at 250° F. (121° C.) and the other was baked for 30 minutes at 300° F. (149° C.). Both cured films exhibited a pencil hardness of F with the film cured at 300° F. exhibiting slightly improved crosshatch adhesion as determined according to ASTM D3359.

EXAMPLE VI

In this Example two two-package coating compositions were prepared by cocuring a material containing amine functionality with ungelled reaction products prepared with an excess of epoxide functional material. The first ungelled reaction product, (A), was prepared exactly as set forth in Example I (utilized DRH epoxy), except that the mole ratios were different. For this Example 2 moles of epoxy, 1 mole of A-1100 silane, and 2 moles of A-163 silane were utilized. The second ungelled reaction product, (B), was also prepared at these mole ratios except that it was prepared with the reactants and under the conditions of Example II, (EPON 828 epoxy) above. In both of these coating compositions the ungelled reaction product was present in one package while the other listed ingredients were in a second package. The two packages were mixed shortly before application.

| Ingredients | Parts by Weight (grams) | |
|---|---|---|
|  | Coating Composition A | Coating Composition B |
| Ungelled Reaction Product (A) | 15.29 |  |
| Ungelled Reaction Product (B) |  | 14.97 |
| A-1100 silane | 2.36 | 2.52 |
| xylene | 4.0 | 4.0 |
| dibutyltin dilaurate | 0.2 | 0.2 |

The coating compositions were applied using a 3 mil drawbar on aluminum panels. The panels were flashed for twenty minutes at room temperature and subsequently baked for 30 minutes at 180° F. (82° C.). The panels were evaluated for pencil hardness, impact resistance, and fingernail mar resistance. The manner of determining pencil hardness and direct impact resistance were described above in Example IV. (The direct impact resistance was evaluated at 20 and 40 inch pounds instead of at 80 inch pounds.) Mar resistance was determined by attempting to scratch the film by firmly drawing a fingernail across the surface of the panel. The films from compositions A and B both had a pencil hardness of B and passed 40 inch pounds of direct impact. Also, they both exhibited good mar resistance.

EXAMPLE VII

In this Example a coating composition was prepared by using the ungelled reaction product of Example II, above, as a cocurant for an acrylate functional material.

| Ingredients | Parts by Weight (grams) |
|---|---|
| ungelled reaction product of Example II | 26.0 |
| hexanediol diacrylate | 6.8 |

The coating composition was prepared by combining the ingredients together with mild agitation. The composition was drawn down on an aluminum panel using a 3 mil drawbar, and the panel was baked for 16 hours at 120° F. (49° C.). The cured film had an H pencil hardness, it was mar resistant (fingernail test) and passed 80 inch pounds of direct impact and 40 inch pounds of reverse impact.

EXAMPLE VIII

In this Example a coating composition was prepared by using the ungelled reaction product of Example I, above, as a cocurant for an acrylate functional material.

| Ingredients | Parts by Weight (grams) |
|---|---|
| ungelled reaction product of Example I | 54.5 |
| glycidyl methacrylate | 14.2 |
| dibutyltin dilaurate | 0.3 |

The coating composition was prepared by blending the ingredients together with mild agitation. Immediately after mixing, the composition was drawn down on a cold rolled steel panel using a 3 mil drawbar. The panel was baked for 4 hours at 120° F. (49° C.) and evaluated for pencil hardness and direct impact resistance under 20, 40 and 60 inch pounds. The cured film had H pencil hardness and passed under both 20 and 40 inch pounds of direct impact. The film failed under 60 inch pounds.

A similar panel was prepared with the exception that the coating composition was allowed to stand in a 120° F. (49° C.) oven for 1 hour prior to being drawn down on the panel and baked. This cured film also had H pencil hardness, however, it passed under 60 inch pounds of direct impact. The film failed under 80 inch pounds.

EXAMPLE IX

In this Example two two-package coating compositions were prepared by cocuring a material containing epoxide functionality with the ungelled reaction product of Example II, above. In both of these coating compositions the ungelled reaction product was present in one package while the epoxide containing material to be cocured with it was in a second package. The two packages were mixed shortly before application. Prior to application to the aluminum panels, the coating compositions were allowed to stand in an oven at 120° F. (49° C.) for one hour.

| Ingredients | Parts by Weight (grams) | |
|---|---|---|
| | Coating Composition A | Coating Composition B |
| ungelled reaction product of Example II, above | 44.8 | 36.1 |
| EPON 828 epoxy | | 8.9 |
| DRH 151 epoxy | 10.8 | |

The coating compositions were prepared by combining the ingredients together with mild agitation. The coating compositions were applied using a 3 mil drawbar on aluminum panels and then baked for 4 hours at 120° F. (49° C.). Both cured coating compositions had an F pencil hardness and passed 100 inch pounds of direct impact.

EXAMPLE X

Part I

In this part of the Example a silicate modified acrylic polyol was prepared.

| Charge | Ingredients | Parts by Weight (grams) |
|---|---|---|
| I | aromatic solvent[10] | 800 |
| | tetraethyl orthosilicate | 104 |
| II | 2-ethylhexyl methacrylate | 850 |
| | 2-hydroxyethyl methacrylate | 150 |
| | tetraethyl orthosilicate | 104 |
| III | ethanol (95 percent) | 150 |
| | hydrogen peroxide (50 percent in water) | 36 |

[10]Same as footnote 9.

A reactor vessel equipped with thermometer, condenser, stirrer, and addition funnel was charged with (I) and heated to a temperature of 135° C. Charges (II) and (III) were then added gradually, (II) over a period of six hours and (III) over a period of 7 hours. The reaction mixture was held at a temperature of 135° C. and then allowed to cool to room temperature.

Part II

A number of coating compositions were prepared using the acrylic polyol of Part I using different proportions of the ungelled reaction product of Example II, above, as a cocurant as set out below.

| Ingredients | Parts by Weight (grams) | | | | |
|---|---|---|---|---|---|
| | A | B | C | D | E |
| acrylic polyol of Part I | 25 | 25 | 25 | 25 | 25 |
| ungelled reaction product of Example II | 6.0 | 10.0 | 14.0 | 18.0 | 22.0 |

| Ingredients | Parts by Weight (grams) | | | | |
|---|---|---|---|---|---|
| | A | B | C | D | E |
| Example II | | | | | |

The aforesaid ingredients were blended together and placed in an oven at 49° C. (120° F.) for one hour to partially prereact the components. At this point compositions A and B gelled and hence, were not tested further. The remaining compositions were drawn down on aluminum panels and permitted to bake in an oven at 135° F. (57° C.) for thirty minutes. The panels were removed from the oven, examined and the films found to be soft. The panels were baked for an additional eight hours at this temperature and then evaluated for pencil hardness and direct impact resistance. Panel C had a pencil hardness of less than B and passed 40 inch pounds of direct impact; panel D had a pencil hardness of less than B and passed 20 inch pounds of direct impact; panel E had a pencil hardness of B and passed 40 inch pounds of direct impact.

EXAMPLE XI

Part I

The following reaction product was prepared and then cocured in Part II with the ungelled reaction product of Example II, above, to form a coating composition exhibiting both good hardness and direct impact resistance.

| Charge | Ingredients | Parts by Weight (grams) |
|---|---|---|
| I | A-163 silane | 272 |
| II | EPON 1001 epoxy | 500 |
| III | EPON 828 epoxy | 200 |
| IV | methanol | 128 |
| V | A-1100 silane | 442 |
| VI | xylene | 200 |
| VII | methanol | 200 |
| VIII | morpholine | 224.2 |

A suitably equipped reactor vessel was charged with (II) and heated to a temperature of 54° C. while charges (III), (I) and (IV) were added. The mixture was then heated to 70° C. until all of the components were melted. Charges (V) and (VI) were then quickly added and after the exotherm subsided (approximately one hour), Charge (VII) was added. After approximately a one and one-half hour period, Charge (VIII) was added, and the mixture heated to 60° C. The reaction mixture was held at this temperature for approximately three and one-half hours and then cooled to room temperature. The resultant product had a viscosity of 1.43 stokes the next day. At 4 days the viscosity was 1.85 stokes and at 20 days the viscosity was 6.30 stokes. The epoxy equivalent weight was 62,377 and the total solids content at 110° C. after one hour was 48.56 percent on the newly made sample.

Part II

| Coating Composition | |
|---|---|
| Ingredients | Parts by Weight (grams) |
| reaction product of Part I | 333.3 |

| Coating Composition | |
|---|---|
| Ingredients | Parts by Weight (grams) |
| ungelled reaction product of Example II, above | 333.3 |
| toluene | 133.3 |

The above components were mixed together at room temperature under nitrogen atmosphere. The initial Gardner Holdt viscosity was A. After 14 days the composition had a Gardner Holdt viscosity of D. After six days at room temperature the composition was applied to an untreated cold rolled steel panel and permitted to stand overnight. The cured film had an H pencil hardness and passed 100 inch pounds of direct impact.

EXAMPLE XII

Part I

This part of the Example illustrates the preparation of an ungelled reaction product of the invention.

| Charge | Ingredients | Parts by Weight (grams) |
|---|---|---|
| I | silane oligomer[11] | 272.4 |
| II | A-1100 silane | 437.0 |
| III | DRH 151 epoxy | 470.2 |
| IV | gamma-glycidoxypropyltrimethoxysilane | 5.1 |
| V | methanol | 87.4 |

[11]This silane oligomer was prepared by the partial hydrolysis of methyltrimethoxysilane (28.66 moles) with deionized water (3.58 moles) in the presence of gamma-aminopropyltriethoxy silane (0.175 moles).

A reactor vessel equipped with stirrer, thermometer, condenser and nitrogen inlet tube was charged with (I) and (II). The mixture was heated to 50° C. and (III) was added over a one-hour period. The reaction mixture was then heated to 70° C. and held at this temperature for a three-hour period. The epoxy equivalent weight of the reaction mixture at this point was infinite. The reaction mixture was then cooled to 60° C. and (IV) was added. The reaction mixture was held at 75° C. until it reached a Gardner-Holdt bubble-tube viscosity of 10 seconds. When this viscosity was attained, the reaction mixture was cooled to 60° C. and (V) was added. The ungelled reaction product had a viscosity of 2.7 stokes, an epoxy equivalent weight of infinity, and a total solids content of 60.9 percent measured for one hour at 150° C.

Part II

In this part of the Example the ungelled reaction product was utilized as a cocurant in a polyester urethane polyol based coating composition formulated as set out below.

| Ingredients | Parts by Weight (grams) |
|---|---|
| polyol/silane resin composition[12] | 8.2 |
| ungelled reaction product of Part I | 11.8 |
| dibutyltin dilaurate | 0.6 |
| xylene | 8.0 |

[12]This resin composition was prepared in the following manner:

| Ingredients | Parts by Weight (grams) |
|---|---|
| urethane modified polyester polyol[b] | 841.2 |
| A-163 silane | 163.2 |
| A-1100 silane | 6.0 |

[b]This polyol is identical to that of footnote 8 except that it was reduced in xylene rather than methyl isobutyl ketone.

A suitably equipped reactor vessel was charged with the aforelisted ingredients and heated to a temperature of 80° C. under a nitrogen atmosphere. The vessel was set for distillation, and the mixture was allowed to distill for about 10 minutes. Subsequently the vessel was set for vacuum distillation. The reaction mixture was distilled under vacuum for approximately a 30 minute period (increasing from 10 inches of mercury to 18 inches of mercury to 24 inches of mercury.) The mixture was then allowed to cool. The product had a total solids of 78 percent measured for 1 hour at 110° C. and a viscosity of 33.5 stokes.

The coating composition was prepared by combining the ingredients together with mild agitation. The coating composition was drawn down with a 3-mil Bird applicator onto two aluminum panels. One panel was flashed at room temperature for 20 minutes and then baked at 150° F. (66° C.) for 30 minutes. The other was allowed to cure at ambient temperature under atmospheric conditions. The panel which was cured under ambient conditions had a pencil of 2H and passed 40, 60 and 80-inch pounds of direct impact. (The film exhibited small tears at 80 inch pounds of impact.) The panel which was flashed and baked had a pencil hardness of 2H and passed 80-inch pounds of direct impact.

What is claimed is:

1. A coating composition comprising at least 40 percent by weight of an ungelled reaction product of
   (i) at least 2 percent by weight of an amine having in a molecule thereof at least one amino hydrogen atom, and at least one silicon atom directly bonded to a hydrolyzable group;
   (ii) at least 4 percent by weight of a material containing at least one epoxide group, at least 30 percent of said epoxide group containing material being essentially free of hydroxyl groups; and
   (iii) a material selected from vinylalkoxysilanes; nonfunctional organosilanes which are represented by the following structural formula:

wherein
R[12] is hydrogen, alkyl, aryl, alkylaryl, arylalkyl, or aryloxyalkyl;
X is —OR[1],

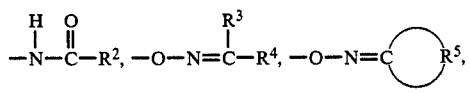

and the monohydroxyl cyclic $C_2$-$C_3$ residue of a 1,2- or 1,3-glycol, wherein
R[1] is $C_1$-$C_3$ alkyl,
R[2] independently is H or $C_1$-$C_4$ alkyl, R$^3$ and R$^4$ independently are H, C$_1$-C$_4$ alkyl, C$_6$-C$_8$ aryl, and R$^5$ is C$_4$-C$_7$ alkylene, and m is an integer ranging from 1 to 2;

organosilicates which are represented by the following structural formula:

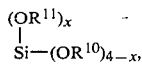

$$\underset{|}{\overset{(OR^{11})_x}{Si}}-(OR^{10})_{4-x},$$

wherein

R$^{10}$ is C$_1$ to C$_3$ alkyl;

R$^{11}$ is an alkyl radical having at least 4 carbon atoms, aryl, alkylaryl, arylalkyl, aryloxyalkyl, or alkyloxyalkyl and x is an integer from 0 to 2;

and partial hydrolysis products thereof; the percentages by weight being based on the total weight of the resin solids of the coating composition including (i), (ii), and (iii).

2. The coating composition of claim 1 additionally comprising an ungelled resin composition comprising an organic polymer having in a molecule thereof at least one group containing a silicon atom said group selected from:

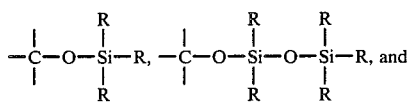

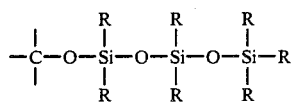

wherein each R independently is selected from the group of moieties consisting of Y, hydrogen, a C$_1$-C$_{10}$ group joined to Si through an Si-C linkage, and OR$^{13}$ in which R$^{13}$ represents alkyl having at least 4 carbon atoms, aryl, alkylaryl, arylalkyl, aryloxyalkyl, or alkyloxyalkyl, wherein Y represents an easily hydrolyzable group which is independently selected from the group consisting of OR$^1$;

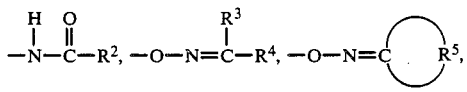

and the monohydroxyl cyclic C$_2$-C$_3$ residue of a 1,2- or 1,3-glycol, wherein R$^1$ is C$_1$-C$_3$ alkyl, R$^2$ independently is H or C$_1$-C$_4$ alkyl, R$^3$ and R$^4$ independently are H, C$_1$-C$_4$ alkyl, C$_6$-C$_8$ aryl, and R$^5$ is C$_4$-C$_7$ alkylene, provided that said resin composition contains an amount of easily hydrolyzable Y moieties such that the ratio of the number of grams of said ungelled resin composition to equivalents of easily hydrolyzable Y moieties in said ungelled resin composition is in a range of from 40 to 667.

3. The coating composition of claim 1 wherein the amine which contains a silicon atom directly bonded to a hydrolyzable group is represented by the following structural formula

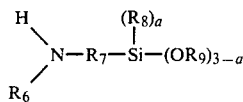

wherein:

R$_6$ is a C$_1$ to C$_{10}$ alkyl radical, hydrogen, an aminoalkyl radical, or an alkoxysilylalkyl radical;

R$_7$ is a C$_1$ to C$_{10}$ alkylene radical;

R$_8$ is a C$_1$ to C$_{10}$ alkyl radical;

R$_9$ is a C$_1$ to C$_3$ alkyl radical, and a is an integer of 0 or 1.

4. The coating composition of claim 3 wherein the amine is gamma-aminopropyltriethoxysilane.

5. The coating composition of claim 3 wherein the amine is gamma-aminopropyltrimethoxysilane.

6. The coating composition of claim 1 wherein the material containing at least one epoxide group is the diglycidyl ether of bisphenol A.

7. The coating composition of claim 1 wherein the material containing at least one epoxide group is the diglycidyl ether of fully hydrogenated bisphenol A.

8. The coating composition of claim 1 wherein the material of (iii) is a nonfunctional organosilane.

9. The coating composition of claim 8 wherein the nonfunctional organosilane is an alkylalkoxysilane represented by the following structural formula:

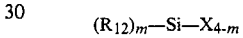

$$(R_{12})_m-Si-X_{4-m}$$

wherein:

R$_{12}$ is an alkyl radical;

X is OR$^1$ wherein R$^1$ is a C$_1$ to C$_3$ alkyl radical; and m is an integer from 1 to 2.

10. The coating composition of claim 1 wherein the material of (iii) is an organosilicate.

11. The ungelled resin composition of claim 2 wherein at least a portion of the R moieties other than Y independently represents a C$_1$-C$_{10}$ group, joined to Si through an Si—C linkage, containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, or a halo group.

12. The ungelled resin composition of claim 2 wherein at least one R is a methoxy group and at least one R is methyl.

13. The ungelled resin composition of claim 2 wherein said organic polymer is a reaction product of an organic polyol and an organosilicon-containing material comprising at least 10 percent by weight of said organosilicon-containing material of a compound corresponding to the formula R—Si(OR$^{14}$)$_3$ wherein R independently represents OR$^{14}$, hydrogen, a C$_1$-C$_{10}$ group joined to Si through an Si—C linkage, or an OR$^{13}$ group in which R$^{13}$ represents alkyl having at least 4 carbon atoms, aryl, alkylaryl, arylalkyl, aryloxyalkyl, or alkyloxyalkyl, and R$^{14}$ independently represents a C$_1$-C$_3$ alkyl group.

14. The ungelled resin composition of claim 2 wherein said organic polymer is of a reaction product of an organic polyol and an organosilicon-containing material comprising at least 10 percent by weight of said organosilicon-containing material of a compound corresponding to the formula

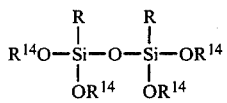

wherein
- R independently represents $OR^{14}$, hydrogen, a $C_1$-$C_{10}$ group joined to Si through an Si-C linkage, or a $OR^{13}$ group in which $R^{13}$ represents alkyl having at least 4 carbon atoms, aryl, alkylaryl, arylalkyl, aryloxyalkyl, or alkyloxyalkyl, and
- $R^{14}$ independently represents a $C_1$-$C_3$ alkyl group.

15. The ungelled resin composition of claim 2 wherein said organic polymer is a reaction product of an organic polyol and an organosilicon-containing material comprising at least 10 percent by weight of said organosilicon-containing material of a compound corresponding to the formula

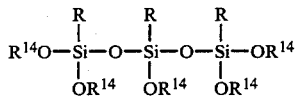

wherein
- R independently represents $OR^{14}$, hydrogen, a $C_1$-$C_{10}$ group joined to Si through an Si-C linkage, or a $OR^{13}$ group in which $R^{13}$ represents alkyl having at least 4 carbon atoms, aryl, alkylaryl, arylalkyl, aryloxyalkyl, or alkyloxyalkyl, and
- $R^{14}$ independently represents a $C_1$-$C_3$ alkyl group.

16. The ungelled resin composition of claim 2 wherein said organic polymer is a reaction product of an organic polyol and an organosilicon-containing material comprising a mixture containing at least 10 percent by weight of said organosilicon-containing material of a compound corresponding to the formula $R-Si(OR^{14})_3$ and at least 10 percent by weight of said organosilicon-containing material of a compound corresponding to the formula

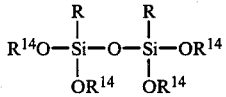

wherein
- R independently represents $OR^{14}$, hydrogen, a $C_1$-$C_{10}$ group joined to Si through an Si-C linkage, or a $OR^{13}$ group in which $R^{13}$ represents alkyl having at least 4 carbon atoms, aryl, alkylaryl, arylalkyl, aryloxyalkyl, or alkyloxyalkyl, and
- $R^{14}$ independently represents a $C_1$-$C_3$ alkyl group.

17. The ungelled resin composition of claim 2 wherein said organic polymer is a reaction product of an organic polyol and a partial hydrolysis product of a compound corresponding to the formula $R-Si(OR^{14})_3$ wherein
- R independently represents $OR^{14}$, hydrogen, a $C_1$-$C_{10}$ group joined to Si through an Si-C linkage, or a $OR^{13}$ group in which $R^{13}$ represents alkyl having at least 4 carbon atoms, aryl, alkylaryl, arylalkyl, aryloxyalkyl, or alkyloxyalkyl, and
- $R^{14}$ independently represents a $C_1$-$C_3$ alkyl group.

18. A coating composition comprising:
(a) at least 40 percent by weight of an ungelled reaction product of:
  (i) at least 2 percent by weight of an amine having in a molecule thereof at least one amino hydrogen atom, and at least one silicon atom directly bonded to a hydrolyzable group;
  (ii) at least 4 percent by weight of a material containing at least one epoxide group, at least 30 percent of said epoxide group containing material being essentially free of hydroxyl groups; and
  (iii) a material selected from vinylalkoxysilanes; nonfunctional organosilanes which are represented by the following structural formula:

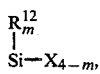

wherein
- $R^{12}$ is hydrogen, alkyl, aryl, alkylaryl, arylalkyl, or aryloxyalkyl;
- X is $-OR^1$,

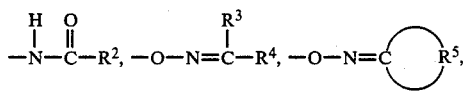

and the monohydroxyl cyclic $C_2$-$C_3$ residue of a 1,2- or 1,3-glycol, wherein
- $R^1$ is $C_1$-$C_3$ alkyl,
- $R^2$ independently is H or $C_1$-$C_4$ alkyl,
- $R^3$ and $R^4$ independently are H, $C_1$-$C_4$ alkyl, $C_6$-$C_8$ aryl, and
- $R^5$ is $C_4$-$C_7$ alkylene, and
- m is an integer ranging from 1 to 2;

organosilicates which are represented by the following structural formula:

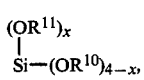

wherein
- $R^{10}$ is $C_1$ to $C_3$ alkyl;
- $R^{11}$ is an alkyl radical having at least 4 carbon atoms, aryl, alkylaryl, arylalkyl, aryloxyalkyl, or alkyloxyalkyl and
- x is an integer from 0 to 2;

and partial hydrolysis products thereof; the percentages by weight being based on the total weight of the resin solids of the coating composition including (i), (ii), and (iii) as a curative for (b) another material different from (a) containing functionality capable of cocuring with (a).

19. The coating composition of claim 18 wherein the material of (b) contains hydroxyl functionality.

20. The coating composition of claim 18 wherein the material of (b) contains epoxide functionality.

21. The coating composition of claim 18 wherein the material of (b) contains amine functionality.

22. The coating composition of claim 18 wherein the material of (b) contains acrylate functionality.

23. The coating composition of claim 18 wherein the material of (b) contains silicate functionality.

24. The coating composition of claim 18 wherein the material of (b) contains mixed functionality.

25. The coating composition of claim 19 wherein the material containing hydroxyl functionality is an acrylic polyol.

26. The coating composition of claim 20 wherein the material containing epoxide functionality is a polyepoxide.

27. The coating composition of claim 18 wherein the material of (b) is present in an amount ranging from about 10 percent by weight to about 85 percent by weight, the percentages based on the total weight of (a) and (b).

28. A two-pack, coating composition comprising:
   (a) a first pack comprising an ungelled reaction product of
      (i) at least 2 percent by weight of an amine having in a molecule thereof at least one amino hydrogen atom, and at least one silicon atom directly bonded to a hydrolyzable group;
      (ii) at least 4 percent by weight of a material containing at least one epoxide group, at least 30 percent of said epoxide group containing material being essentially free of hydroxyl groups; and
      (iii) a material selected from vinylalkoxysilanes; nonfunctional organosilanes which are represented by the following structural formula:

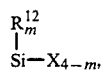

wherein
$R^{12}$ is hydrogen, alkyl, aryl, alkylaryl, arylalkyl, or aryloxyalkyl;
X is —$OR^1$,

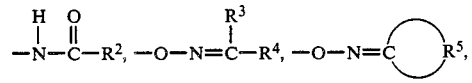

and the monohydroxyl cyclic $C_2$-$C_3$ residue of a 1,2- or 1,3-glycol, wherein
$R^1$ is $C_1$-$C_3$ alkyl,
$R^2$ independently is H or $C_1$-$C_4$ alkyl,
$R^3$ and $R^4$ independently are H, $C_1$-$C_4$ alkyl, $C_6$-$C_8$ aryl, and
$R^5$ is $C_4$-$C_7$ alkylene, and
m is an integer ranging from 1 to 2;
organosilicates which are represented by the following structural formula:

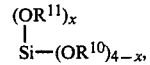

wherein
$R^{10}$ is $C_1$ to $C_3$ alkyl;
$R^{11}$ is an alkyl radical having at least 4 carbon atoms, aryl, alkylaryl, arylalkyl, aryloxyalkyl, or alkyloxyalkyl and
x is an integer from 0 to 2;
and partial hydrolysis products thereof;
   (b) a second pack comprising another material different from (a) containing functionality capable of cocuring with (a); the ungelled reaction product being present in the coating composition in an amount of at least 40 percent by weight;
the percentages by weight being based on the total weight of the resin solids of the coating composition including (i), (ii) and (iii).

29. A coating composition comprising an ungelled reaction product of:
   (i) an amine having in a molecule thereof at least one amino hydrogen atom and at least one silicon atom directly bonded to a hydrolyzable group;
   (ii) a material containing at least one epoxide group;
   (iii) a material selected from vinylalkoxysilanes; nonfunctional organosilanes which are represented by the following structural formula:

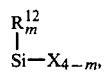

wherein
$R^{12}$ is hydrogen, alkyl, aryl, alkylaryl, arylalkyl, or aryloxyalkyl;
X is —$OR^1$,

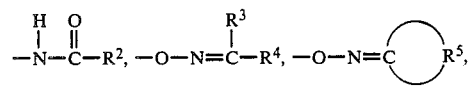

and the monohydroxyl cyclic $C_2$-$C_3$ residue of a 1,2- or 1,3-glycol, wherein
$R^1$ is $C_1$-$C_3$ alkyl,
$R^2$ independently is H or $C_1$-$C_4$ alkyl,
$R^3$ and $R^4$ independently are H, $C_1$-$C_4$ alkyl, $C_6$-$C_8$ aryl, and
$R^5$ is $C_4$-$C_7$ alkylene, and
m is an integer ranging from 1 to 2;
organosilicates which are represented by the following structural formula:

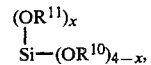

wherein
$R^{10}$ is $C_1$ to $C_3$ alkyl;
$R^{11}$ is an alkyl radical having at least 4 carbon atoms, aryl, alkylaryl, arylalkyl, aryloxyalkyl, or alkyloxyalkyl and
x is an integer from 0 to 2;
and partial hydrolysis products thereof;
   (iv) an ungelled resin composition comprising an organic polymer having in a molecule thereof at least one group containing a silicon atom said group selected from:

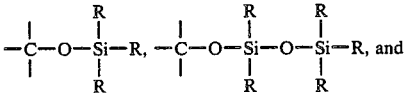

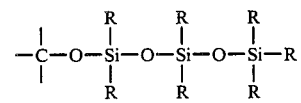

wherein each R independently is selected from the group of moieties consisting of Y, hydrogen, a $C_1$–$C_{10}$ group joined to Si through an Si–C linkage, and $OR^{13}$ in which $R^{13}$ represents alkyl having at least 4 carbon atoms, aryl, alkylaryl, arylalkyl, aryloxyalkyl, or alkyloxyalkyl, wherein Y represents an easily hydrolyzable group which is independently selected from the group consisting of $OR^1$;

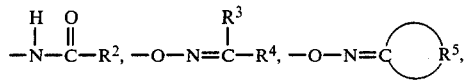

and the monohydroxyl cyclic $C_2$–$C_3$ residue of a 1,2- or 1,3-glycol, wherein $R^1$ is $C_1$–$C_3$ alkyl,
$R^2$ independently is H or $C_1$–$C_4$ alkyl,
$R^3$ and $R^4$ independently are H, $C_1$–$C_4$ alkyl, $C_6$–$C_8$ aryl, and
$R^5$ is $C_4$–$C_7$ alkylene, provided that said resin composition contains an amount of easily hydrolyzable Y moieties such that the ratio of the number of grams of said ungelled resin composition to equivalents of easily hydrolyzable Y moieties in said ungelled resin composition is in a range of from 40 to 667.

30. The coating composition of claim 1 comprising at least 50 percent by weight of the ungelled reaction product.

* * * * *